US009842275B2

(12) United States Patent
Seki

(10) Patent No.: US 9,842,275 B2
(45) Date of Patent: Dec. 12, 2017

(54) IMAGE PROCESSING DEVICE, IMAGE PROCESSING METHOD, AND INFORMATION STORAGE DEVICE

(71) Applicant: OLYMPUS CORPORATION, Hachioji-shi, Tokyo (JP)

(72) Inventor: Asako Seki, Kunitachi (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/248,780

(22) Filed: Aug. 26, 2016

(65) Prior Publication Data
US 2016/0364875 A1    Dec. 15, 2016

Related U.S. Application Data

(63) Continuation of application No. PCT/JP2015/055337, filed on Feb. 25, 2015.

(30) Foreign Application Priority Data

Feb. 28, 2014 (JP) ................ 2014-037955

(51) Int. Cl.
*G06K 9/00* (2006.01)
*G06K 9/56* (2006.01)
(Continued)

(52) U.S. Cl.
CPC ........... *G06K 9/56* (2013.01); *G06T 7/593* (2017.01); *G06T 19/006* (2013.01); *G06T 19/20* (2013.01);
(Continued)

(58) Field of Classification Search
USPC .............................. 382/106, 154
See application file for complete search history.

(56) References Cited

U.S. PATENT DOCUMENTS

2008/0080762 A1  4/2008  Kawakami
2009/0202120 A1  8/2009  Otsuka
(Continued)

FOREIGN PATENT DOCUMENTS

| JP | 2003-16427 A | 1/2003 |
| JP | 2008-90601 A | 4/2008 |
| JP | 2009-186442 A | 8/2009 |

OTHER PUBLICATIONS

Zabih et al., "Non-parametric Local Transforms for Computing Visual Correspondence", Lecture Notes in Computer Science, vol. 801, Computer Vision-ECCV '94, (8 pages).
(Continued)

*Primary Examiner* — Alex Liew
(74) *Attorney, Agent, or Firm* — Westerman, Hattori, Daniels & Adrian,

(57) ABSTRACT

An image processing device includes a processor including hardware, the processor being configured to calculate comparison result information through a comparison process performed on the results of a census transform process performed on a first image and the results of the census transform process performed on a second image, set weight information, calculate a cost using the comparison result information and the weight information, calculate the amount of disparity using the cost, set a first weight having as low degree of contribution to the cost on a neighboring pixel which is determined to be affected by noise to a large extent among a plurality of neighboring pixels, and set a second weight having a high degree of contribution to the cost on a neighboring pixel which is determined to be affected by noise to a small extent among the plurality of neighboring pixels.

14 Claims, 19 Drawing Sheets

(51) Int. Cl.
*G06T 7/593* (2017.01)
*G06T 19/00* (2011.01)
*G06T 19/20* (2011.01)

(52) U.S. Cl.
CPC .............. *G06T 2207/10021* (2013.01); *G06T 2207/10028* (2013.01); *G06T 2207/20048* (2013.01); *G06T 2207/20228* (2013.01)

(56) References Cited

U.S. PATENT DOCUMENTS

| | | | | |
|---|---|---|---|---|
| 2010/0142828 | A1* | 6/2010 | Chang | G06T 7/593 |
| | | | | 382/209 |
| 2012/0163704 | A1* | 6/2012 | Chang | G06T 7/0022 |
| | | | | 382/154 |
| 2013/0329135 | A1* | 12/2013 | Baqai | G06T 5/002 |
| | | | | 348/624 |

OTHER PUBLICATIONS

Lee et al., "Local Disparity Estimation with Three-Moded Cross Census and Advanced Support Weight", 2013, IEEE, (20 pages).
International Search Report dated May 19, 2015, issued in counterpart International Application No. PCT/JP2015/055337 (1 page).

* cited by examiner

FIG. 8

WEIGHT

| 1 | 2.3 | 2.3 | 2.3 | 2.3 |
|---|---|---|---|---|
| 2.3 | 2.3 | 2.3 | 2.3 | 1 |
| 2.3 | 2.3 | × | 2.3 | 2.3 |
| 2.3 | 2.3 | 1 | 1 | 2.3 |
| 1 | 1 | 2.3 | 2.3 | 2.3 |

↑

TH=15
α=1
β=2.3

DIFFERENCE CALCULATION RESULTS
(LEFT IMAGE AND RIGHT IMAGE)

| 5 | 100 | 75 | 55 | 3 | 120 | 55 | 35 | 133 | 89 |
|---|---|---|---|---|---|---|---|---|---|
| 43 | 20 | 92 | 16 | 27 | 10 | 17 | 134 | 140 | 105 |
| 115 | 1 | × | 40 | 62 | 22 | 123 | × | 22 | 98 |
| 103 | 11 | 100 | 47 | 120 | 122 | 135 | 34 | 122 | 53 |
| 56 | 129 | 32 | 14 | 112 | 91 | 84 | 68 | 132 | 144 | ated, and set a second# IMAGE PROCESSING DEVICE, IMAGE PROCESSING METHOD, AND INFORMATION STORAGE DEVICE

CROSS REFERENCE TO RELATED APPLICATION

This application is a continuation of International Patent Application No. PCT/JP2015/055337, having an international filing date of Feb. 25, 2015, which designated the United States, the entirety of which is incorporated herein by reference. Japanese Patent Application No, 2014-037955 filed on Feb. 28, 2014 is also incorporated herein by reference in its entirety.

BACKGROUND

The present invention relates to an image processing device, an image processing method, an information storage device, and the like.

A stereo matching process is widely known as a technique that calculates the depth (depth information or distance information) using an image. A technique that utilizes a census transform process during the stereo matching process is also known (see JP-A-2003-16427). Ramin Zabih and John Woodfill, "Non-parametric Local Transforms for Computing Visual Correspondence", Lecture Notes in Computer Science, Vol. 801, Computer Vision-ECCV '94 discloses the census transform process in detail. The census transform process assigns a value (bit data) corresponding to the quantitative relationship between the pixel of interest and each neighboring pixel.

While a known census transform process assigns 0 or 1 corresponding to the quantitative relationship (i.e., difference) between the pixel of interest and each neighboring pixel, Zucheul Lee et al., "Local Disparity Estimation with Three-Moded Cross Census and Advanced Support Weight" discloses a technique that assigns bit data (00) even when the difference is within a noise buffer, and calculates the hamming distance. Zucheul Lee et al., "Local Disparity Estimation with Three-Moded Cross Census and Advanced Support Weight" states that the effect of noise in a flat area can be reduced or suppressed by utilizing the above technique.

SUMMARY

According to one aspect of the invention, there is provided an image processing device comprising:
a processor comprising hardware, the processor being configured to:
during a stereo matching process performed on the first image and the second image,
perform a census transform process on a first image and a second image and calculate comparison result information through a comparison process between results of the census transform process on the first image and results of the census transform process on the second image;
set weight information for calculating a cost;
calculate the cost at a pixel of interest using the comparison result information and the weight information; and
calculate an amount of disparity at the pixel of interest using the cost,
wherein the processor is configured to set a first weight having a low degree of contribution to the cost on a neighboring pixel which is determined to be affected by noise to a large extent among a plurality of neighboring pixels situated around the pixel of interest, and set a second weight having a high degree of contribution to the cost on a neighboring pixel which is determined to be affected by the noise to a small extent among a plurality of neighboring pixels situated around the pixel of interest, the plurality of neighboring pixels being situated in a given area within the first image and the second image.

According to another aspect of the invention, there is provided an image processing method comprising:
during a stereo matching process performed on the first image and the second image,
performing a census transform process on a first image and a second image and calculating comparison result information through a comparison process between results of the census transform process on the first image and results of the census transform process on the second image;
setting weight information for calculating a cost;
calculating the cost at a pixel of interest using the comparison result information and the weight information; and
calculating an amount of disparity at the pixel of interest using the cost,
wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among the plurality of neighboring pixels situated around the pixel of interest, the plurality of neighboring pixels being situated in a given area within the first image and the second image.

According to another aspect of the invention, there is provided a computer-readable storage device with an executable program stored thereon, wherein the program instructs a microprocessor to perform the following steps of during a stereo matching process performed on the first image and the second image,
performing a census transform process on a first image and a second image and calculating comparison result information through a comparison process between results of the census transform process on the first image and results of the census transform process on the second image;
setting weight information for calculating a cost;
calculating the cost at a pixel of interest using the comparison result information and the weight information; and
calculating an amount of disparity at the pixel of interest using the cost,
wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among a plurality of neighboring pixels situated around the pixel of interest, the plurality of neighboring pixels being situated in a given area within the first image and the second image.

BRIEF DESCRIPTION OF THE DRAWINGS

FIG. 8 is a view illustrating a weight setting process (first embodiment).

DESCRIPTION OF EXEMPLARY EMBODIMENTS

Figure 1:
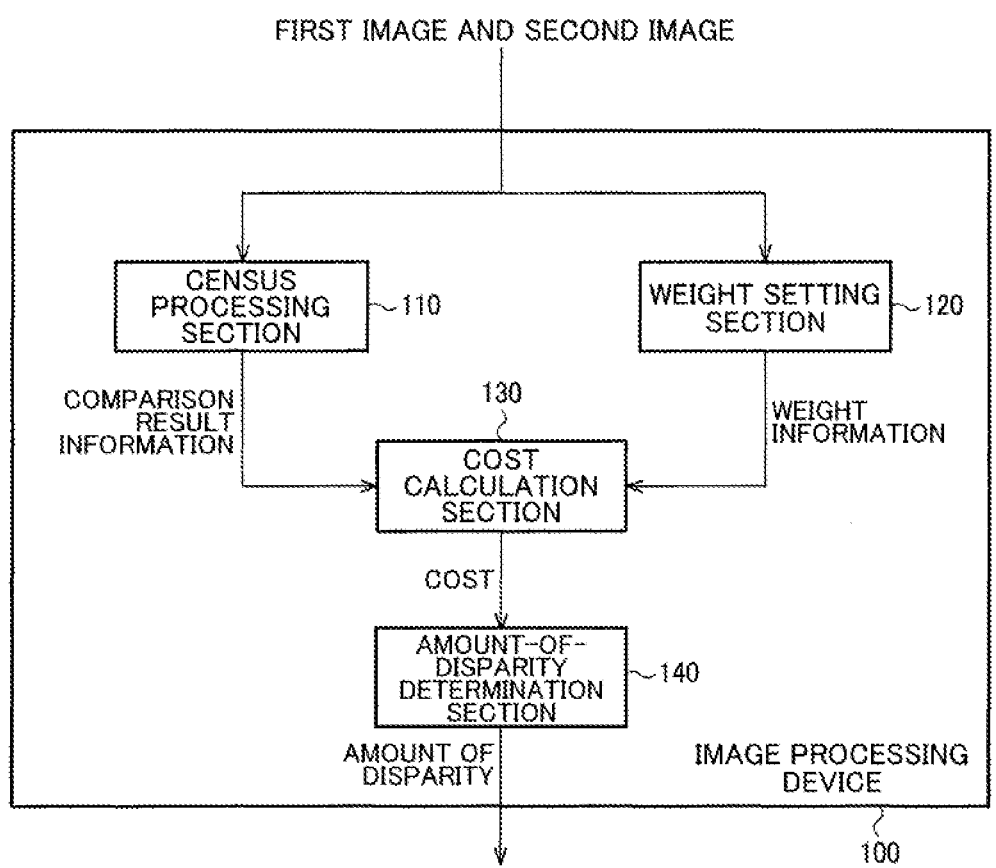
FIG. 1 illustrates a configuration example of an image processing device according to the embodiments of the invention.

According to one embodiment of the invention, there is provided an image processing device comprising:

a processor comprising hardware, the processor being configured to:

during a stereo matching process performed on the first image and the second image, perform a census transform process on a first image and a second image, and calculate comparison result information through a comparison process between results of the census transform process on the first image and results of the census transform process on the second image;

set weight information for calculating a cost:

calculate the cost at a pixel of interest using the comparison result information and the weight information; and calculate an amount of disparity at the pixel of interest using the cost, wherein the processor is configured to set a first weight having a low degree of contribution to the cost on a neighboring pixel which is determined to be affected by noise to a large extent among a plurality of neighboring pixels situated around the pixel of interest, and set a second weight having a high degree of contribution to the cost on a neighboring pixel which is determined to be affected by the noise to a small extent among a plurality of neighboring pixels situated around the pixel of interest, the plurality of neighboring pixels being situated in a given area within the first image and the second image.

According to the image processing device, the weight information is set taking account of the effect of noise, and the cost when determining the amount of disparity during the stereo matching process is calculated using the weight information. According to this configuration, since the degree of contribution of a neighboring pixel that is affected by noise to a large extent can be reduced, it is possible to improve robustness against noise and flexibly set the degree of contribution, for example.

In the image processing device, the processor may be configured to calculate the cost referring to a conversion table that links the comparison result information, the weight information, and the cost.

This makes it possible to use the conversion table when calculating the cost.

In the image processing device, the processor may be configured to calculate a differential value between the pixel of interest and the neighboring pixel, and set the weight information by determining an effect of the noise from the calculated differential value.

This makes it possible to determine the effect of the noise and set the weight information using the calculated differential value between the pixel of interest and the neighboring pixel, for example.

In the image processing device, the processor may be configured to set the weight information that is set to on each neighboring pixel based on a result obtained by comparing the differential value between the neighboring pixel and the pixel of interest in the first image, with a given threshold value, and a result obtained by comparing the differential value between the neighboring pixel and the pixel of interest in the second image, with the given threshold value.

This makes it possible to compare the differential value between the neighboring pixel and the pixel of interest with the threshold value with respect to each of a plurality of images used for the stereo matching process, and set the weight information based on the comparison results, for example.

In the image processing device, the processor may be configured to set the given threshold value that is compared with the differential value corresponding to the noise value.

This makes it possible to set the weight corresponding to the state of noise, for example.

In the image processing device, the processor may be configured to set the first weight on the neighboring pixel when at least one of the differential values, which are between the neighboring pixel and the pixel of interest, in the first image and the second image, is equal to or smaller than the given threshold value.

This makes it possible to set the first weight (having a relatively low degree of contribution) on the neighboring pixel when it has been determined that a given neighboring pixel is affected by noise to a large extent in at least one of a plurality of images, for example.

In the image processing device, the processor may be configured to convert the results of the comparison process into numerical values to acquire the comparison result information.

This makes it possible to acquire the census transform comparison results for a plurality of images as numerical data instead of bit data, for example.

In the image processing device, the processor may be configured to set a weight mask as the weight information, the weight mask having a configuration in which a first logic level is set as the first weight, and a second logic level that differs from the first logic level is set as the second weight.

This makes it possible to use the data (bit data) represented by the logic level as the weight information, for example.

In the image processing device, the processor may be configured to calculate first weight information on the first image by setting the first logic level as the first weight, and setting the second logic level as the second weight, calculate second weight information on the second image by setting the first logic level as the first weight, and setting the second logic level as the second weight, and perform a logical calculation using the first weight information and the second weight information to calculate the weight mask.

According to this configuration, it is possible to more easily calculate the weight information (weight mask) used to calculate the cost through logical calculations by calculating the weight information that includes the data (bit data) represented by the logic level corresponding to each of a plurality of images, for example.

In the image processing device, the processor may be configured to skip the calculating of the cost with respect to a pixel at which a value of the weight mask is set to the first logic level.

This makes it possible to reduce the calculation load (processing load) when calculating the cost, and simplify the hardware configuration, for example.

In the image processing device, the processor may be configured to refer to a conversion table in which a conversion result is determined corresponding to a combination of a value represented by the comparison result information and a value of the weight mask, and calculate the cost using the conversion result calculated on each neighboring pixel within the given area.

This makes it possible to calculate the cost using the conversion table in which bit data is linked to at least the weight information, for example.

In the image processing device, the processor may be configured to calculate the cost by calculating average using the result of cumulative sum, which is by calculating on each neighboring pixel using the comparison result information and the weight mask, and the number of neighboring pixels that are set to the second logic level on This makes it possible to perform the cost calculation process that takes account of the number of pixels (effective pixel) that have been determined to be affected by noise to a small extent, for example.

According to another embodiment of the invention, there is provided an image processing method comprising:

during a stereo matching process performed on the first image and the second image, performing a census transform process on a first image and a second image and calculating comparison result information through a comparison process between results of the census transform process on the first image and results of the census transform process on the second image;

setting weight information for calculating a cost;

calculating the cost at a pixel of interest using the comparison result information and the weight information, and calculating an amount of disparity at the pixel of interest using the cost, wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among the plurality of neighboring pixels, the plurality of neighboring pixels being situated in a given area within the first image and the second image.

According to another embodiment of the invention, there is provided a computer-readable storage device with an executable program stored thereon, wherein the program instructs a microprocessor to perform the following steps of:

during a stereo matching process performed on the first image and the second image, performing a census transform process on a first image and a second image and calculating comparison result information through a comparison process between results of the census transform process on the first image and results of the census transform process on the second image;

setting weight information for calculating a cost;

calculating the cost at a pixel of interest using the comparison result information and the weight information; and calculating an amount of disparity at the pixel of interest using the cost, wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among the plurality of neighboring pixels, the plurality of neighboring pixels being situated in a given area within the first image and the second image.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Method

A method used in connection with the exemplary embodiments of the invention is described below. A technique that utilizes the census transform process during the stereo matching process is known (see above). The census transform process uses the quantitative relationship between the pixel of interest and each neighboring pixel instead of directly using the pixel value. The census transform process thus makes it possible to reduce or suppress the effect of a change in brightness and the like, and implement an accurate matching process.

Figure 5:
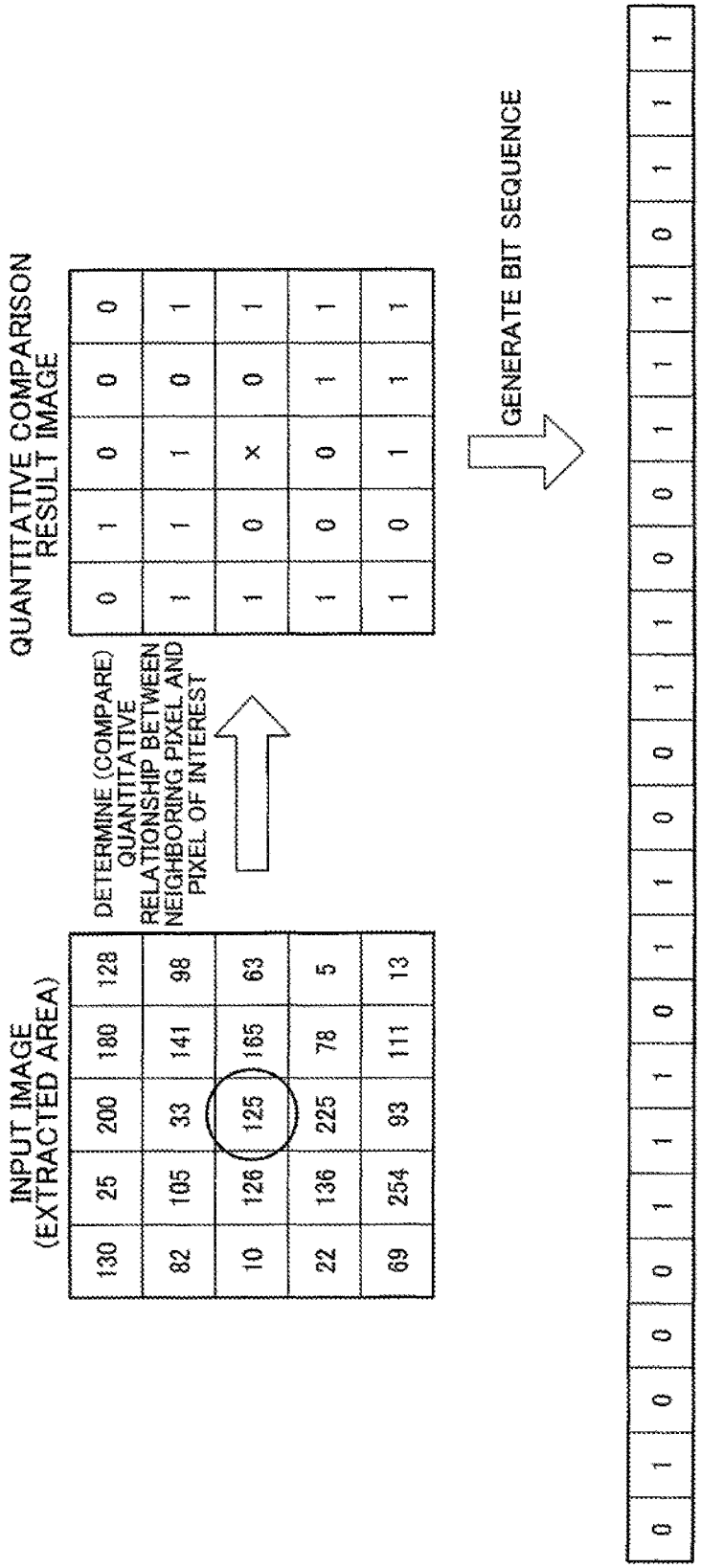
FIG. 5 is a view illustrating a census transform process.

However, when the process is performed on a flat area of the image, the difference in pixel value between the pixel of interest and each neighboring pixel decreases. In the example illustrated in FIG. 5 (described later), the difference in pixel value between the pixel of interest (indicated by a circle) and the neighboring pixel situated directly on the left side of the pixel of interest is 1. In the example illustrated in FIG. 5, since bit data "0" is assigned to a neighboring pixel having a pixel value equal to or larger than the pixel value (=125) of the pixel of interest, and bit data "1" is assigned to a neighboring pixel having a pixel value smaller than the pixel value of the pixel of interest, bit data "0" is assigned to the neighboring pixel situated directly on the left side of the pixel of interest. If the pixel value of the neighboring pixel has decreased by 2 due to noise, the quantitative relationship is reversed, and bit data "1" is assigned to the neighboring pixel.

Specifically, an area (e.g., flat area) in which the difference in pixel value is small is easily affected by noise, and may cause deterioration in processing accuracy. When the difference in pixel value is sufficiently large (see the neighboring pixel (pixel value=10) situated on the left side of the pixel of interest through one neighboring pixel), the relationship in which the pixel value of the neighboring pixel is smaller than the pixel value of the pixel of interest is maintained even when noise occurs to some extent, and the bit data "1" obtained by the census transform process is reliable.

Zucheul Lee et al., "Local Disparity Estimation with Three-Moded Cross Census and Advanced Support Weight" discloses a technique that takes account of such a situation. Specifically, the effect of noise is reduced or suppressed by assigning bit data "00" to a neighboring pixel that lies within the noise buffer and is determined to be affected by noise to a large extent instead of assigning bit data "01" or "10" that is assigned to a neighboring pixel that lies within the noise buffer.

However, the technique disclosed in Zucheul Lee et al., "Local Disparity Estimation with Three-Moded Cross Census and Advanced Support Weight" cannot necessarily sufficiently reduce or suppress the effect of noise. For example, the environment in which the image used for the stereo matching process is acquired may change in various ways, and the amount and the tendency of noise may also change corresponding to a change in environment. Specifically, noise changes corresponding to a change in object (e.g., landscape, human, or endoscopic image (tissue)). Noise also changes corresponding to the light source (e.g., sunlight or illumination light), the photographic situation (e.g., daytime or night), and the characteristics of a camera (e.g., lens or image sensor).

An optimum stereo matching process differs depending on the characteristics of the image and the characteristics of noise. For example, it is desirable to change the conditions (e.g., a pixel that is easily affected by noise is excluded from the processing target, or the degree of contribution (e.g., the degree of contribution to cost calculation) is relatively decreased corresponding to a pixel that is easily affected by noise) depending on the situation. When relatively decreasing the degree of contribution, an optimum solution for the relative relationship with a pixel that has a relatively high degree of contribution (i.e., a pixel that is not easily affected by noise) differs depending on the situation. Since the technique disclosed in Zucheul Lee et al., "Local Disparity Estimation with Three-Moded Cross Census and Advanced Support Weight" does not take account of the above point, it is difficult to implement a flexible process corresponding to the situation.

In order to deal with the above problem, several aspects of the invention propose a method that determines a pixel that is easily affected by noise and a pixel that is not easily affected by noise, and implements a flexible setting process corresponding to a change in environment and the like. More specifically, an image processing device 100 according to the exemplary embodiments of the invention during a stereo matching process performed on the first image and the second image includes a census processing section 110 that performs a census transform process on a first image and a second image and calculates comparison result information through a comparison process between the results of the census transform process on the first image and the results of the census transform process on the second image, a weight setting section 120 that sets weight information for calculating a cost, a cost calculation section 130 that calculates the cost at a pixel of interest using the comparison result information and the weight information, and an amount-of-disparity determination section 140 that calculates the amount of disparity at the pixel of interest using the cost (see FIG. 1). The weight setting section 120 sets a first weight having a low degree of contribution to the cost on a neighboring pixel which is determined to be affected by noise to a large extent among a plurality of neighboring pixels situated around the pixel of interest, and sets a second weight having a high degree of contribution to the cost on a neighboring pixel which is determined to be affected by noise to a small extent among the plurality of neighboring pixels, the plurality of neighboring pixels being situated in a given area within the first image and the second image.

Note that the terms "first image" and "second image" used herein refer to a left image and a right image used for the stereo matching process. Although an example in which the first image is the left image, and the second image (right image) is shifted with respect to the left image, is described below, the configuration is not limited thereto.

The term "pixel of interest" used herein refers to one pixel in the first image, and the term "given area" used herein refers to an area that has a given shape and a given area and includes the pixel of interest (at the center in a narrow sense) (e.g., an area that includes W×W pixels). In the example illustrated in FIG. 5, the given area is a 5×5-pixel square area that includes the pixel of interest at the center. The term "neighboring pixel" used herein refers to a pixel in the given area and is not the pixel of interest.

Figure 4:
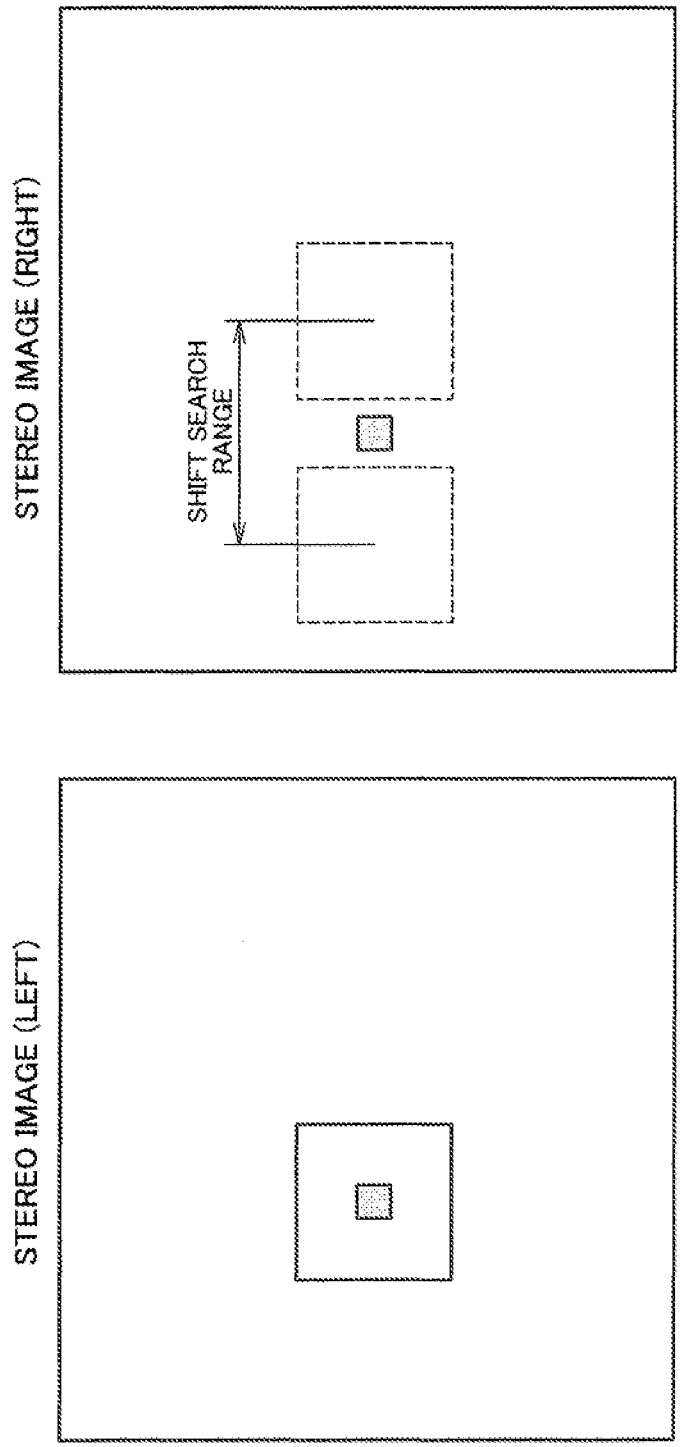
FIG. 4 is a view illustrating an image area shift method.
Figure 9:
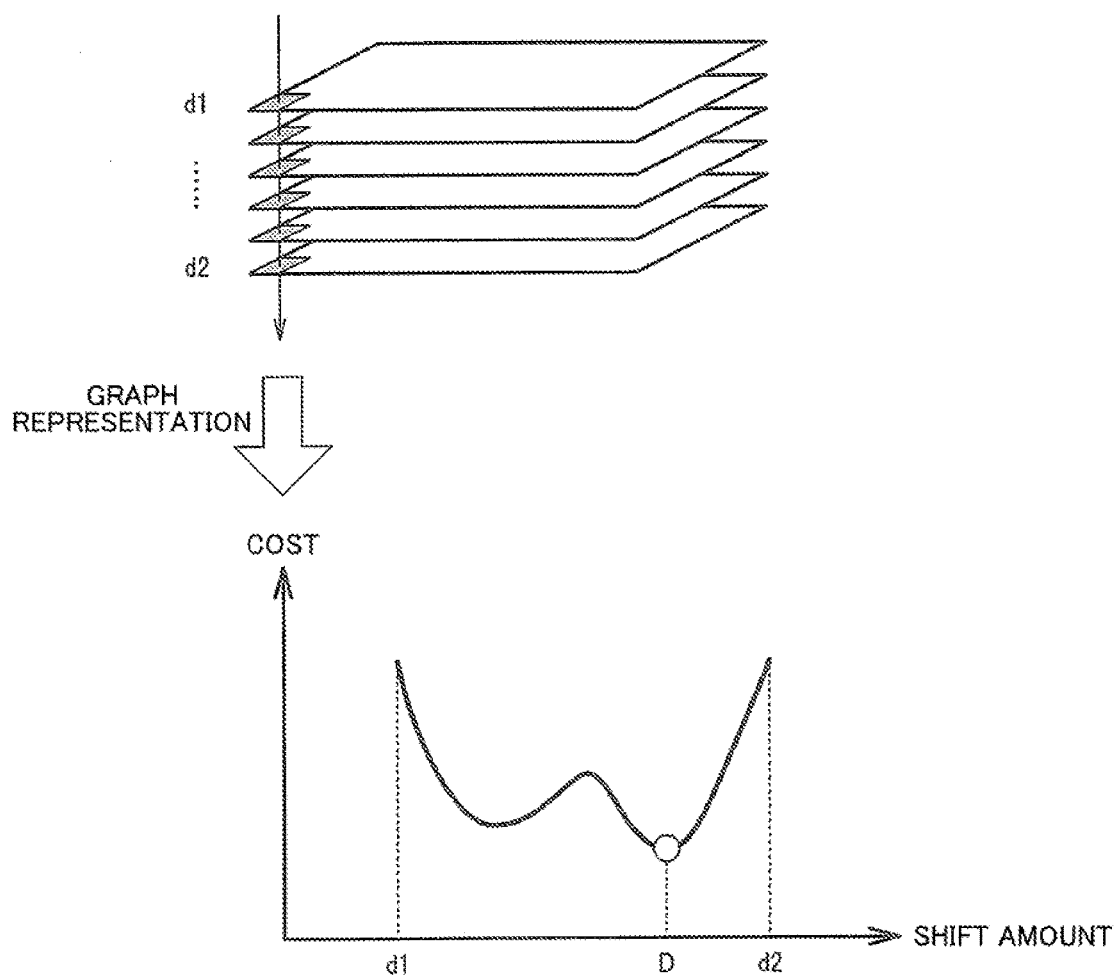
FIG. 9 is a view illustrating an amount-of-disparity determination method.

The stereo matching process calculates the degree by which the pixel of interest that is set to one of the images is shifted within the other image (i.e., calculates the amount of disparity). As described later with reference to FIG. 4, when one pixel of interest has been set to the left image, a pixel within the right image that is shifted by a given shift amount is set to be the pixel of interest, and the given area is set based on the pixel of interest set to the right image. The shift amount is changed within a given range at a given interval, and a shift amount among a plurality of shift amounts that optimizes the cost is calculated (determined) to be the amount of disparity. Specifically, the cost at the pixel of interest is not a single value, but is calculated corresponding to the number of shift amounts. For example, when N shift amounts are set in advance, N pixel of interests and N given areas are set to the right image corresponding to one pixel of interest set to the left image, and N cost values are acquired (see the graph illustrated in FIG. 9, for example).

Since the stereo matching process normally calculates the amount of disparity corresponding to a plurality of pixels (all of the pixels in a narrow sense) included in the image, it is necessary to also perform the update process on the pixel of interest set to the left image. Specifically, it is necessary to perform the process that calculates one cost value corresponding to a loop with respect to the pixel of interest and a loop with respect to the shift amount. For example, when each of the left image and the right image includes M pixels, and the amount of disparity is calculated on a pixel basis, the cost calculation process is performed M×N times.

Figure 7:
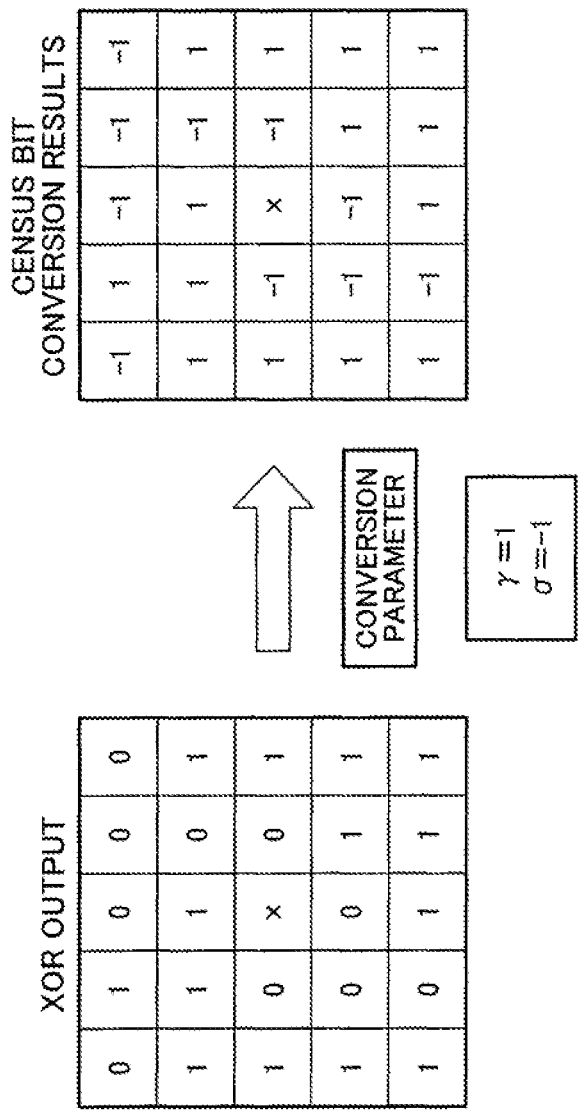
FIG. 7 is a view illustrating a census bit conversion method.

The comparison result information through the comparison process between the results of the census transform process on the left image and the results of the census transform process on the right image may be the same information (e.g., XOR output illustrated in FIG. 7) as that obtained using a known method, or may be information that has been converted using a conversion parameter (see the census bit conversion results illustrated in FIG. 7). The same information as that obtained using a known method refers to a set of bit data (0 or 1) in a narrow sense, and the information that has been converted using a conversion parameter refers to a set of numerical data in a narrow sense.

The term "weight information" refers to information for calculating the cost. For example, the weight information represents a given weight that is assigned to each neighboring pixel. For example, the weight information may be information illustrated in FIG. 8 in which numerical data "1" and numerical data "2.3" are respectively set to be the first weight and the second weight, and "1" or "2.3" is assigned to each neighboring pixel. Alternatively, the first weight and the second weight may be bit data. For example, the first weight and the second weight may be the weight mask described later with reference to FIG. 12. Note that the first weight and the second weight are set so that the first weight is lower than the second weight with respect to the degree of contribution to the cost, and the numerical value assigned to the first weight need not necessarily be smaller than the numerical value assigned to the second weight.

According to the above configuration, it is possible to set the weight taking account of the degree of the effect of noise. Specifically, since a pixel that is affected by noise to a large extent can be set to have a relatively low degree of contribution to the process, it is possible to implement a process that reduces or suppresses the effect of noise. More specifically, since a pixel at which the quantitative relationship obtained by the census transform process is easily reversed due to noise (e.g., a pixel at which the absolute difference between the pixel of interest and the neighboring pixel is equal to or smaller than a threshold value) is reduced in the degree of contribution to the cost as compared with other pixels when calculating the stereo matching cost, the cost changes to only a small extent due to noise.

Figure 16:
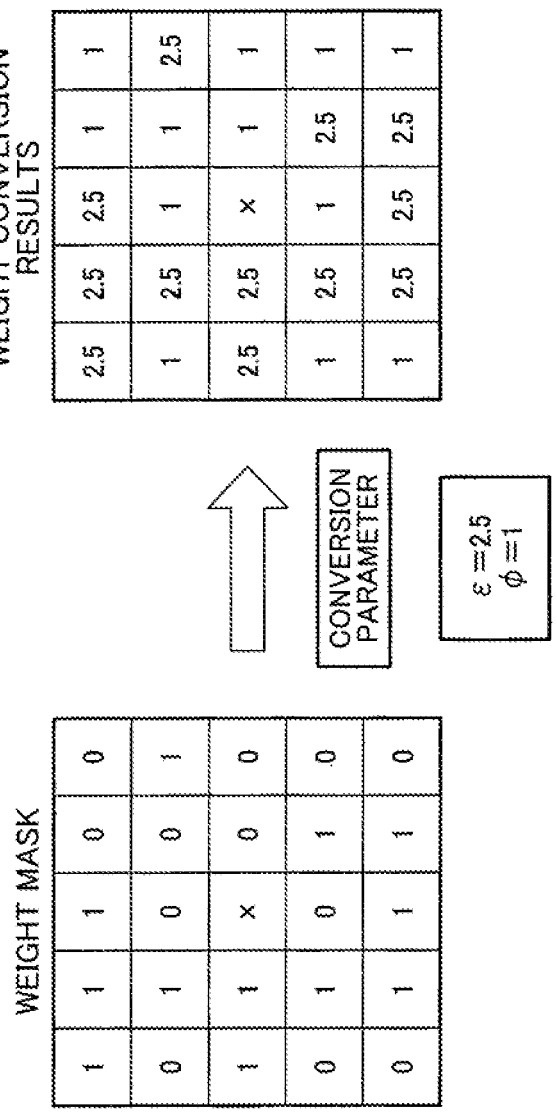
FIG. 16 is a view illustrating a weight setting process (fourth embodiment).

When a set of numerical data is used as the weight information (see FIG. 8), each numerical value can be set arbitrarily (see FIGS. 8 and 16). Therefore, a pixel that is affected by noise to a large extent can be flexibly set with respect to the degree of contribution to the process (information processing) corresponding to the situation, and it is possible to accurately implement the stereo matching process that utilizes the census transform process.

First to fifth embodiments of the invention are described below. The first embodiment illustrates a basic embodiment of the invention that includes a process that converts the comparison results obtained by the census transform process into numerical values, and a process that sets the weight information that is a set of numerical data. The second embodiment and the third embodiment illustrate an example in which a weight mask is used as the weight information. Note that the second embodiment and the third embodiment differ from each other as to the details of the cost calculation process that uses the weight mask. The fourth embodiment illustrates an example in which the weight mask is calculated as the weight information, and then converted into numerical data. The fifth embodiment illustrates an example in which the comparison result information and the weight information are calculated using bit data, and the cost is calculated using a conversion table that links the bit data set and the cost on a pixel basis.

2. First Embodiment

Figure 2:
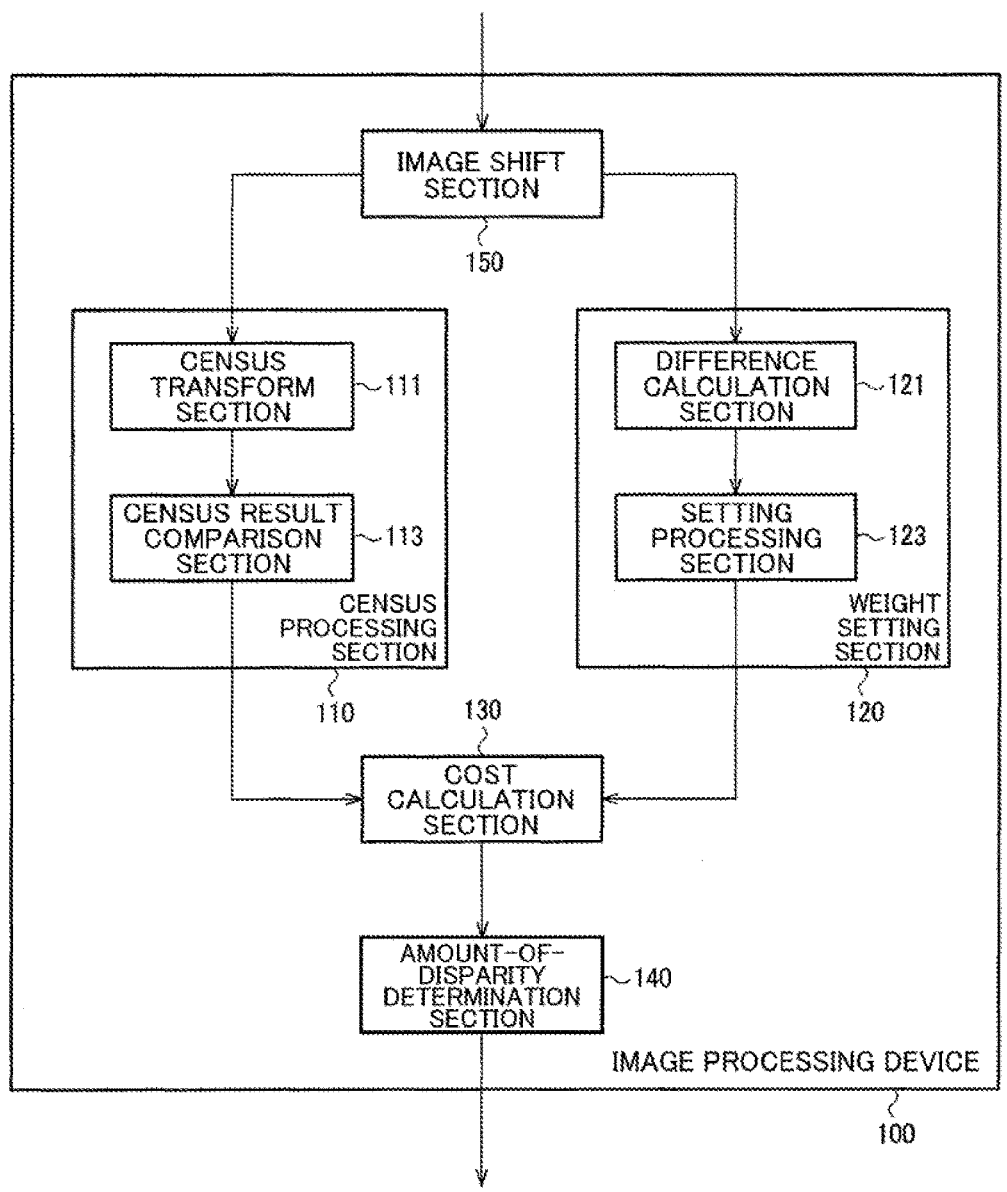
FIG. 2 illustrates a detailed configuration example of an image processing device according to the embodiments of the invention.

FIG. 2 illustrates a configuration example of an image processing device 100 according to the first embodiment. The image processing device 100 includes an image shift section 150, a census processing section 110, a weight setting section 120, a cost calculation section 130, and an amount-of-disparity determination section 140. The census processing section 110 includes a census transform section 111 and a census result comparison section 113, and the weight setting section 120 includes a difference calculation section 121 and a setting processing section 123. Note that the configuration of the image processing device 100 is not limited to the configuration illustrated in FIG. 2. Various modifications may be made, such as omitting some of the elements illustrated in FIG. 2, or providing (adding) an additional element.

The image shift section 150 shifts one of the left image and the right image by a preset shift amount. In the first embodiment, the right image is shifted within the range from d1 to d2 at a given interval (e.g., at an interval of one pixel).

The census transform section 111 performs the census transform process on the left image and the right image. The census result comparison section 113 compares the results of the census transform process on the left image with the results of the census transform process on the right image.

The difference calculation section 121 performs a process that calculates the differential value between the pixel of interest and each neighboring pixel on the left image and the right image. The setting processing section 123 sets a weight on each neighboring pixel using the calculated differential value. The details of the process performed by each section are described later.

Figure 3:
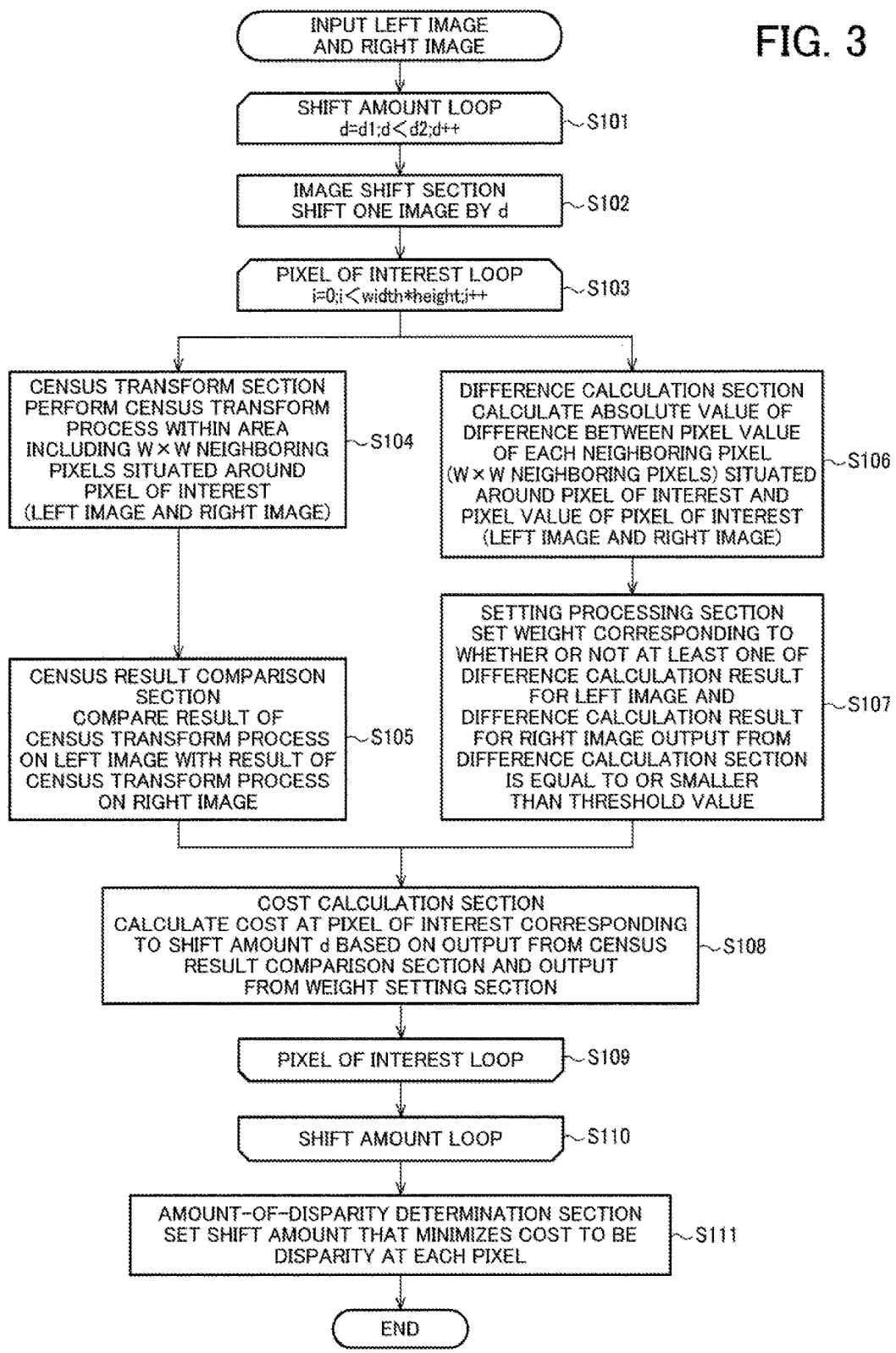
FIG. 3 is a flowchart illustrating a process (first embodiment).

FIG. 3 is a flowchart illustrating the process according to the first embodiment. In the flowchart illustrated in FIG. 3, the cost is calculated on a pixel basis after shifting the image, and the process is performed within each shift search range. Note that an area set to one of the images (e.g., the given area set to the right image) may be shifted with respect to an area set to the other image (e.g., the given area set to the left image) (see FIG. 4). In the example illustrated in FIG. 4, an area set to the right image is shifted in a state in which an area set to the left image is fixed. Note that an area set to the left image may be shifted in a state in which an area set to the right image is fixed.

In the flowchart illustrated in FIG. 3, the amount of disparity is calculated after calculating the cost corresponding to each shift amount on a pixel basis. Note that the memory capacity can be saved by calculating the amount of disparity each time the cost at one pixel has been calculated corresponding to each shift amount. A noise reduction process may be performed as a pre-process when the amount of noise is large (not illustrated in FIG. 3).

In a step S101, a loop process is performed within a given shift amount range. In the example illustrated in FIG. 3, the shift amount is updated on a pixel basis within the range from d1 to d2. The image shift section 150 shifts the right image by the preset shift amount (S102).

A pixel of interest loop process is then performed (S103). In the example illustrated in FIG. 3, all of the pixels included in the left image are sequentially set to be the pixel of interest. Since the right image is shifted in the step S102, the pixel of interest within the right image can be determined when the pixel of interest within the left image has been determined.

When the pixel of interest within the left image and the pixel of interest within the right image have been determined, the census processing section 110 performs the process that calculates the comparison result information, and the weight setting section 120 performs the process that sets the weight information. More specifically, the census transform section 111 assigns "0" or "1" to each pixel of the image (right image) that has been shifted by the image shift section 150 and the non-shifted image (left image) corresponding to the quantitative relationship between the pixel value of each neighboring pixel (W×W neighboring pixels) situated around the pixel of interest and the pixel value of the pixel of interest, and generates a bit sequence having a length of W*W−1 that represents the results (see FIG. 5) (S104). Note that the given area need not necessarily be a square area.

The census transform section 111 may assign "0" or "1" to each pixel in an arbitrary way corresponding to the quantitative relationship. In the example illustrated in FIG. 5, "1" is assigned when the pixel value of the neighboring pixel is smaller than the pixel value (=125) of the pixel of interest, and "0" is assigned when the pixel value of the neighboring pixel is equal to or larger than the pixel value of the pixel of interest. The census transform process is defined to be a process that generates the bit sequence illustrated in FIG. 5. Note that the census transform section 111 may directly output the quantitative comparison result image illustrated in FIG. 5. In this case, the pixel that corresponds to the pixel of interest may be set to be null. An example in which the census transform section 111 outputs the quantitative comparison result image is described below (see the expressions and the drawings) for convenience of explanation.

Figure 6:
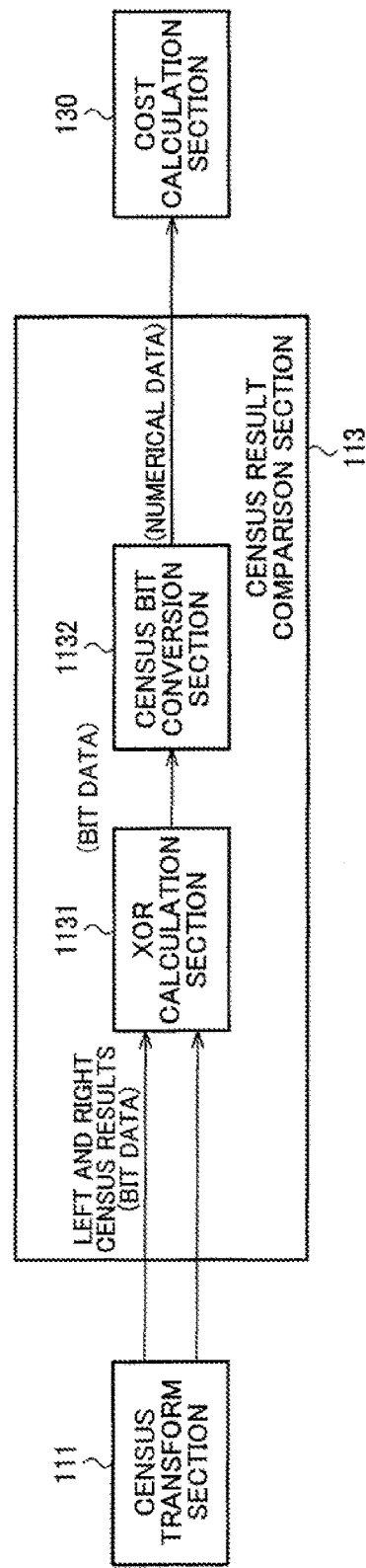
FIG. 6 illustrates a configuration example of a census result comparison section.

The census result comparison section 113 compares the output from the census transform process on the left image with the output from the census transform process on the right image (S105). FIG. 6 illustrates a specific configuration example of the census result comparison section 113. The census result comparison section 113 includes an XOR calculation section 1131 and a census bit conversion section 1132. The XOR calculation section 1131 performs an XOR (exclusive OR) calculation on the left image and the right image (output from the census transform section 111) acquired in the step S104 on a pixel basis or a bit basis. The XOR calculation result for a pixel (or a bit) at which an identical census transform result was obtained for the left image and the right image is "0", and the XOR calculation result for a pixel (or a bit) at which a different census transform result was obtained for the left image and the right image is "1".

The census bit conversion section 1132 converts the output from the XOR calculation section 1131 on a pixel basis or a bit basis so that a larger value is obtained when the output is "1" as compared with the case where the output is "0" (see the following expression (1) and FIG. 7). In the expression (1), T represents the output from the census bit conversion section 1132, and t represents the output from the XOR calculation section 1131. (i, j) are indices assigned to the pixel of interest.

$$T(i+k, j+l) = \begin{cases} \gamma & \text{if } t(i+k, j+l) = 1 \\ \delta & \text{if } t(i+k, j+l) = 0 \end{cases} \quad (1)$$

$$k = -\frac{W-1}{2} \sim \frac{W-1}{2}, \quad l = \frac{W-1}{2} \sim \frac{W-1}{2}$$

Although FIG. 7 illustrates an example in which the conversion parameter γ=1 is used when the output is "1", and the conversion parameter δ=−1 is used when the output is "0", the configuration is not limited thereto. The conversion parameters γ and δ are not limited to an integer. The conversion parameter is empirically calculated in advance. When the shift amount that minimizes the cost is determined to be the amount of disparity, the conversion parameter γ is larger than the conversion parameter δ. The conversion parameter γ may be smaller than the conversion parameter δ when the shift amount that maximizes the cost is determined to be the amount of disparity.

Although an example in which the comparison result information output from the census processing section 110 is the numerical data output from the census bit conversion section 1132, is described below, the bit data output from the XOR calculation section 1131 may be used as the comparison result information.

The difference calculation section 121 calculates the absolute value Diff of the difference between the pixel value of each neighboring pixel (W×W neighboring pixels) situated around the pixel of interest and the pixel value of the pixel of interest on a pixel basis (see the following expression (2)) (S106). Note that I in the expression (2) represents the pixel value.

$$\text{Diff}(i+k, j+l) = |I(i+k, j+l) - I(i,j)| \quad (2)$$

The setting processing section 123 sets the weight M on a pixel basis corresponding to the results output from the difference calculation section 121 (see the following expression (3) and FIG. 8) (S107). A value α is used as the weight when at least one of the difference calculation result for the left image and the difference calculation result for the right image output from the difference calculation section 121 is equal to or smaller than a threshold value, and a value β that is larger than the value α is used as the weight when the difference calculation result for the left image and the difference calculation result for the right image output from the difference calculation section 121 are larger than the threshold value. Note that the value α and the value β are not limited to an integer. $\text{diff}_1$ and $\text{diff}_2$ in the expression (3) respectively represent the difference calculation result for the left image and the difference calculation result for the right image output from the difference calculation section 121.

$$M(i+k, j+l) = \quad (3)$$
$$\begin{cases} \alpha & \text{if } (\text{diff}_1(i+k, j+l) < Th) \text{ or } (\text{diff}_2(i+k, j+l) < Th) \\ \beta & \text{otherwise} \end{cases}$$

For example, the value α (=1) is set to the upper left pixel (start bit) as the weight since the absolute difference (=120) calculated based on the right image is larger than the threshold value Th (=15), but the absolute difference (=5) calculated based on the left image is equal to or smaller than the threshold value Th. The value β (=2.3) is set to the pixel (second bit) situated directly on the right side of the upper left pixel as the weight since the absolute difference (=100) calculated based on the left image and to the absolute difference (=55) calculated based on the right image are larger than the threshold value Th.

The weight parameter α and the weight parameter β are empirically calculated in advance. The threshold value Th is determined corresponding to the amount of noise. For example, the threshold value Th may be determined taking account of the statistic (e.g., dispersion) in a flat area. The threshold value may be provided in a stepwise manner using the statistic corresponding to the pixel value of the input image.

When the comparison result information and the weight information have been calculated, the cost calculation section 130 calculates the cost using the comparison result information and the weight information. For example, the cost calculation section 130 calculates a product on a pixel basis or a bit basis, and calculates the sum of the results for the pixels within the given area to calculate the cost C (see the following expression (4)). Note that the case where k=0 and l=0 is excluded from the calculation when using the expression (4).

$$C(i, j) = \sum_{l=-\frac{W-1}{2}}^{\frac{W\infty1}{2}} \sum_{k=-\frac{W-1}{2}}^{\frac{W-1}{2}} T(i+k, j+l) \cdot M(i+k, j+l) \quad (4)$$

Note that the cost may be calculated by combining the method that utilizes the census transform results with another method. For example, the census transform results may be combined with the SAD or SSD calculated from the pixel values of the image, or the SAD or SSD calculated from the differential results for the image. The above calculation results may be combined in various ways. For example, the above calculation results may be combined as represented by the following expression (5). In the expression (5), C1 to C3 represent the cost calculated using each method, and γ1 to γ3 represent parameters obtained empirically. The balance between the costs calculated using a plurality of methods is adjusted using these parameters when combining the calculation results obtained using a plurality of methods.

$$C_{sum} = \frac{C_1}{\gamma_1} + \frac{C_2}{\gamma_2} + \frac{C_3}{\gamma_3} + \ldots \quad (5)$$

A threshold value may be provided with respect to the cost. The threshold value may be provided corresponding to the cost calculated using each method, or may be provided corresponding to the result obtained by combining the cost calculated using each method. For example, the following expressions (6) and (7) may be used. The expression (6) represents an example in which the threshold value is provided corresponding to the cost calculated using each method. In the expression (6), tau1 to tau3 represent the threshold value provided corresponding to the cost calculated using each method. The expression (7) represents an example in which the threshold value is provided corresponding to the result obtained by combining the cost calculated using each method. In the expression (7), τ represents the threshold value provided corresponding to the total cost. Note that min(p, q) represents p or q, whichever is smaller. In the expression (6), a limit is provided so that the cost calculated using each method does not exceed the corresponding threshold value. In the expression (7), a limit is provided so that the total cost does not exceed the threshold value.

$$C = \frac{\min(C_1, \tau_1)}{\gamma_1} + \frac{\min(C_2, \tau_2)}{\gamma_2} + \frac{\min(C_3, \tau_3)}{\gamma_3} + \ldots \quad (6)$$

$$C = \min(C_{sum}, \tau) \quad (7)$$

When the steps S103 to S108 have been performed on each pixel (pixel of interests), the pixel of interest loop process (that is performed from the step S103) is terminated (S109). When the steps S102 to S109 have been performed using each shift amount while updating the shift amount in the step S102, the shift amount loop process (that is performed from the step S101) is terminated (S110).

The cost within the shift amount range from d1 to d2 has thus been calculated corresponding to each pixel within the image. The amount-of-disparity determination section 140 compares the costs calculated by the cost calculation section 130 within the shift search range (i.e., the range from d1 to d2 in FIGS. 3 and 9) on a pixel basis, and calculates (determines) the shift amount D that minimizes the cost to be the amount of disparity at the corresponding pixel (see FIG. 9).

According to the first embodiment, the weight setting section 120 calculates the differential value between the pixel of interest and the neighboring pixel, and set the weight information by determining the effect of noise from the calculated differential value.

More specifically, the weight setting section 120 includes the difference calculation section 121, and sets the weight using the calculation results of the difference calculation section 121. Although an example in which the absolute difference is used has been described above, a simple differential value (including a positive value and a negative value) may also be used. This makes it possible to determine whether or not each neighboring pixel is easily affected by noise from the differential pixel value.

The weight setting section 120 may set the weight information on each neighboring pixel based on the result obtained by comparing the differential value between the neighboring pixel and the pixel of interest in the first image, with a given threshold value, and the result obtained by comparing the differential value between the neighboring pixel and the pixel of interest in the second image, with the given threshold value.

According to this configuration, it is possible to set the weight on each of the left image and the right image through the threshold value comparison process performed on the differential value.

More specifically, the weight setting section 120 sets the first weight (i.e., a weight having a low degree of contribution to the cost) on the neighboring pixel when at least one of the differential value, which are between the neighboring pixel and the pixel of interest, in the first image and the second image, is equal to or smaller than the given threshold value.

Since the left image and the right image are captured so as to differ in the position of the imaging section, and one of the left image and the right image is shifted by the given shift amount, the left image and the right image necessarily differ in the degree of effect of noise at each neighboring pixel within a given range. Since the comparison result information is calculated by comparing the census transform results for the left image with the census transform results for the right image, both the left image and the right image are used to calculate the comparison result information on the neighboring pixel at a given position. Specifically, whether or not the comparison result information on a given neighboring pixel is reliable may be determined based on whether or not it is determined that the effect of noise is small with respect to both the left image and the right image. In other words, when the effect of noise is large in at least one of the left image and the right image, the robustness with respect to noise can be improved by lowering the degree of contribution to the cost with respect to the corresponding neighboring pixel (i.e., setting the first weight on the corresponding neighboring pixel).

Note that it is determined that the effect of noise is large when the differential value is equal to or smaller than the threshold value Th when the absolute difference is used. Specifically, a negative threshold value Th2 is provided when a negative differential value is also taken into consideration, and it is determined that the effect of noise is large when the differential value is equal to or larger than the threshold value Th2 (when the differential value is smaller than 0).

The weight setting section 120 may set the given threshold value that is compared with the differential value corresponding to noise value.

This makes it possible to set the threshold value corresponding to noise value. For example, when the amount of noise is large, the quantitative relationship may be reversed due to noise even when the differential value between the pixel of interest and the neighboring pixel is sufficiently large. On the other hand, when the amount of noise is small, it is not likely that the quantitative relationship is reversed due to noise even when the differential value between the pixel of interest and the neighboring pixel is moderate. Specifically, it is possible to implement a flexible process by changing the threshold value corresponding to the expected state of noise value instead of setting the threshold value to a constant value.

The census processing section 110 may convert the results of the comparison process into a numerical value to acquire the comparison result information.

Specifically, the census bit conversion section 1132 may convert the calculation results of the XOR calculation section 1131 using the conversion parameters γ and δ (see above).

According to Zucheul Lee et al., "Local Disparity Estimation with Three-Moded Cross Census and Advanced Support Weight", when the left image and the right image have been compared to calculate the hamming distance, a value provided to the hamming distance by a given neighboring pixel is 0 when the difference from the pixel of interest lies within the noise buffer with respect to both the left image and the right image, and when the difference from the pixel of interest lies outside the noise buffer having the same sign with respect to both the left image and the right image. Specifically, the degree of contribution to the cost is identical when the bit data assigned to the left image and the bit data assigned to the right image are identical, although whether or not the difference from the pixel of interest lies within the noise buffer is determined, and the bit data "00", "01", or "10" is assigned. Therefore, it may be impossible to determine a pixel that affects the hamming distance due to noise, and a pixel that does not affect the hamming distance due to noise.

According to the first embodiment, since a product using the weight information is calculated after the census bit conversion section 1132 has performed the conversion process, a pixel for which there is no difference between the left image and the right image is not set to "0", and contributes to the cost. According to the first embodiment, since the weight information is set taking account of the effect of noise, a different degree of contribution can also be set to a pixel for which there is no difference between the left image and the right image corresponding to the effect of noise. In the example illustrated in FIGS. 7 and 8, a value that reduces the cost is required for a pixel for which there is no difference between the left image and the right image. In this case, the value is calculated to be −2.3 (i.e., the cost reduction effect is high) when the effect of noise is small, and is calculated to be −1 (i.e., the cost reduction effect is low) when the effect of noise is large.

Note that part or most of the process performed by the image processing device 100 and the like according to the first embodiment may be implemented by a program. In this case, the image processing device 100 and the like according to the first embodiment are implemented by causing a processor (e.g., CPU) to execute a program. More specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the first embodiment based on the program (data) stored in the information storage device. Specifically, a program that causes a computer (i.e., a device that includes an operation section, a processing section, a storage section, and an output section) to function as each section according to the first embodiment (i.e., a program that causes a computer to execute the process implemented by each section according to the first embodiment) is stored in the information storage device.

The image processing device 100 and the like according to the first embodiment may include a processor and a memory. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The memory stores a computer-readable instruction. Each section of the image processing device 100 and the like according to the first embodiment is implemented by causing the processor to execute the instruction. The memory may be a semiconductor memory (e.g., SRAM or DRAM), or may be a register, a hard disk, or the like. The instruction may be an instruction included in an instruction set that is included in a program, or may be an instruction that causes a hardware circuit included in the processor to operate.

Various modifications may be made of the first embodiment. For example, when the weight includes 0 or a value close to 0, the cost may become approximately 0 irrespective of the shift amount in an area (e.g., flat area) that is easily affected by noise. In this case, an interpolation process may be performed on such an area by performing a propagation process (e.g., belief propagation) after calculating a disparity map. This interpolation process may also be performed when implementing the second to fifth embodiments.

3. Second Embodiment

Figure 10:
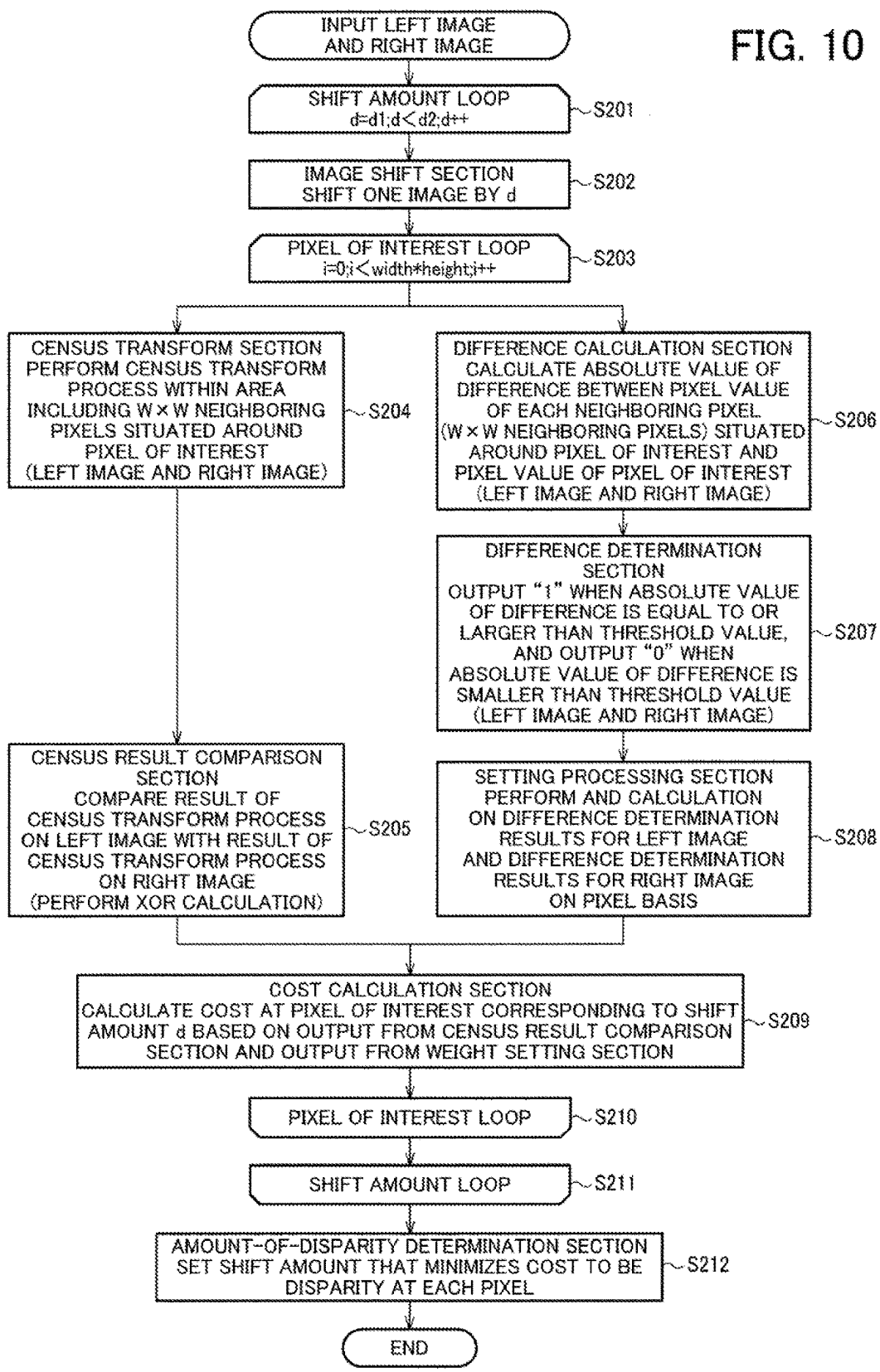
FIG. 10 is a flowchart illustrating a process (second embodiment).

FIG. 10 is a flowchart illustrating the process according to the second embodiment. The steps S201 to S206 and S209 to S212 illustrated in FIG. 10 are the same as the steps S101 to S106 and S108 to Sill illustrated in FIG. 3, and detailed description thereof is omitted.

Figure 11:
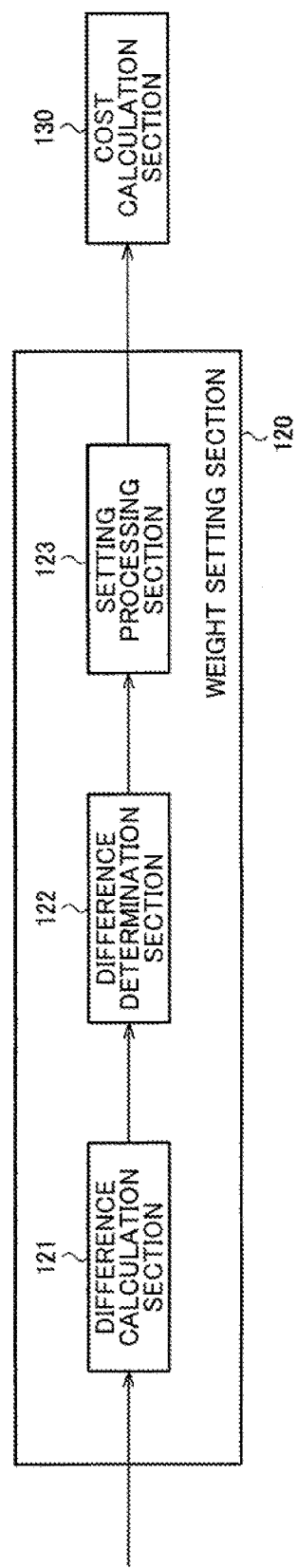
FIG. 11 illustrates a configuration example of a weight setting section.

FIG. 11 illustrates a configuration example of the weight setting section 120 according to the second embodiment. The weight setting section 120 includes a difference calculation section 121, a difference determination section 122, and a setting processing section 123.

In the step S206, the difference calculation section 121 performs a process that calculates the absolute difference between the pixel of interest and each neighboring pixel on the left image and the right image. The difference determination section 122 outputs "1" on a pixel basis when the result output from the difference calculation section 121 with respect to each of the left image and the right image is equal to or larger than a threshold value, and outputs "0" on a pixel basis when the result output from the difference calculation section 121 with respect to each of the left image and the right image is not equal to or larger than the threshold value (see the following expression (8)) (S207). Note that the difference determination section 122 may output "0" when the result output from the difference calculation section 121 is equal to the threshold value taking account of the relationship with the first embodiment. Note that diffth in the expression (8) represents the output from the difference determination section 122.

$$diffth(i+k, j+l) = \begin{cases} 1 & \text{if } diff(i+k, j+l) \geq Th \\ 0 & \text{otherwise} \end{cases} \quad (8)$$

The difference determination section 122 may output the determination result in the form of a 1-bit image corresponding to the left image and the right image, or may output the determination result in the form of a (W*W−1)-bit bit sequence corresponding to the left image and the right image (in the same manner as in the case of generating the bit sequence from the quantitative comparison result image during the census transform process). An example in which the census transform section 111 outputs the quantitative comparison result image, and the difference determination section 122 outputs the determination result image, is described below (see the expressions and the drawings) (in the same manner as described in connection with the first embodiment) for convenience of explanation.

The setting processing section 123 generates a weight mask from the 1-bit image (left image and right image) or the (W*W−1)-bit bit sequence (left bit sequence and right bit sequence) output from the difference determination section 122 (S208). The setting processing section 123 generates the weight mask by performing an AND calculation on the 1-bit image (left image and right image) on a pixel basis, or performing an AND calculation on the (W*W−1)-bit bit sequence (left bit sequence and right bit sequence) (see the following expression (9)). Note that diffth$_1$ and diffth$_2$ in the expression (9) respectively represent the output from the difference determination section 122 corresponding to the left image, and the output from the difference determination section 122 corresponding to the right image.

$$M(i+k,j+l) = diffth_1(i+k,j+l) \text{ and } diffth_2(i+k,j+l) \quad (9)$$

Specifically, the setting processing section 123 generates the weight mask in which the weight is set to "O" when the absolute difference between the pixel of interest and the neighboring pixel calculated from the left image or the right image is equal to or smaller than the threshold value. Note that the output from the census result comparison section 113 and the output from the difference determination section 122 or the setting processing section 123 need not necessarily be handled as independent data, and may be handled as combined or integrated single bit data.

Note that the process performed by the census result comparison section 113 in the step S205 is the same as described above in connection with the first embodiment. The census result comparison section 113 may output bit data (i.e., the output from the XOR calculation section 1131), or may output numerical data (i.e., the output from the census bit conversion section 1132). Note that the processing load can be reduced when the census bit conversion section 1132 is not provided since the process can be implemented by a bit calculation process.

The cost calculation section 130 calculates the cost using the comparison result information and the weight information. The cost calculation section 130 calculates a product of the comparison result information and the weight information on a pixel basis or a bit basis. When the comparison result information represents bit data, and the weight information also represents bit data (weight mask), it suffices to perform an AND calculation on the comparison result information and the weight information since the comparison result information and the weight information are 1-bit data.

Figure 12:
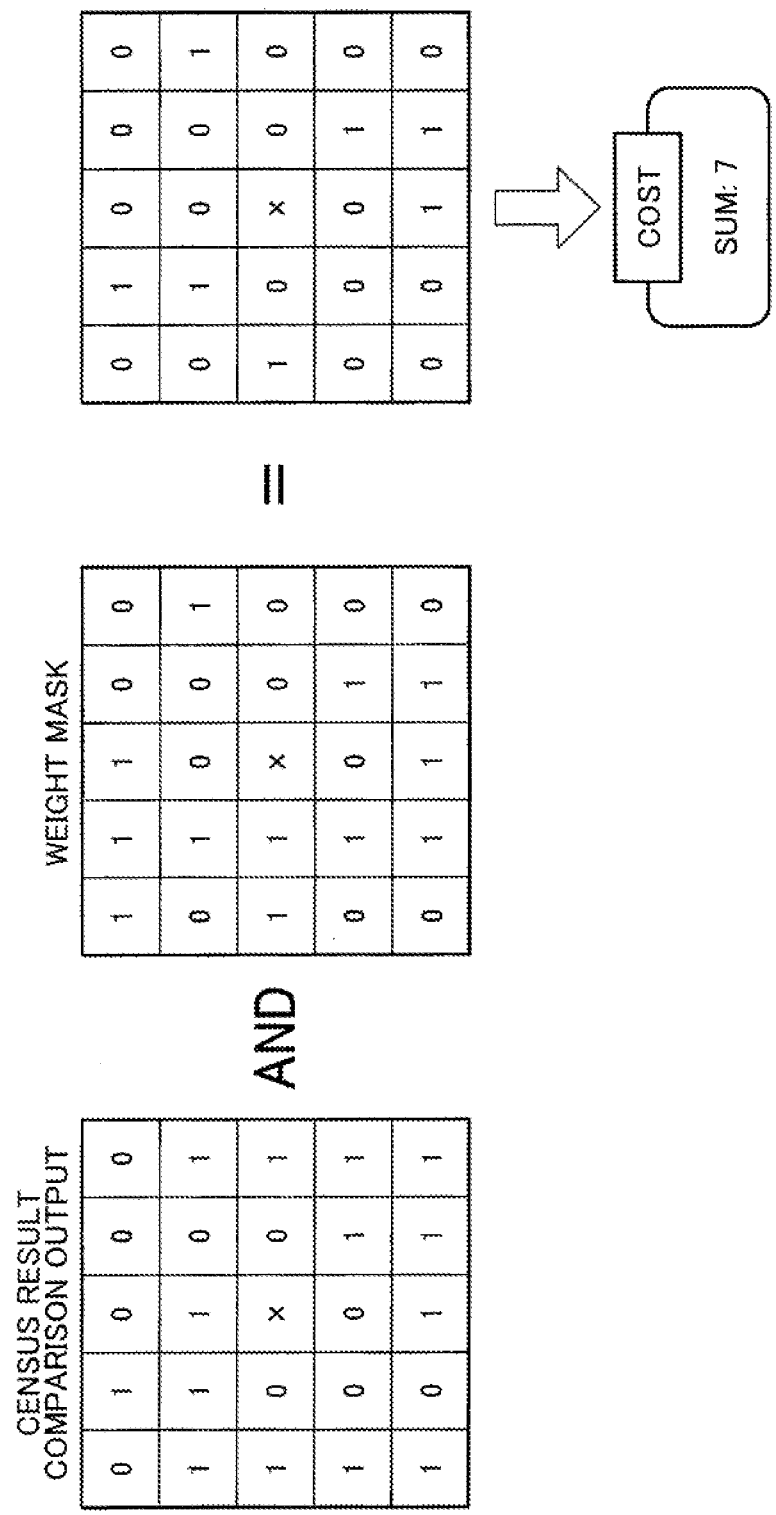
FIG. 12 is a view illustrating a cost calculation process (second embodiment).

As illustrated in FIG. 12, the cost calculation section 130 adds up the AND results on a pixel basis or a bit basis. Specifically, the cost calculation section 130 performs the same process as the process represented by the expression (4).

According to the second embodiment, the weight setting section 120 sets the weight mask as the weight information, the weight mask having a configuration in which a first logic level is set as the first weight, and a second logic level that differs from the first logic level is set as the second weight.

Note that the first logic level and the second logic level differ from each other. In the example described above, the first logic level is "0" (bit data), and the second logic level is "1" (bit data). Note that the first logic level and the second logic level are not limited to 1-bit data. Various modifications may be made, such as using data represented by 2 or more bits as the first logic level and the second logic level.

This makes it possible to utilize bit data (weight mask) as the weight information, and facilitate the cost calculation process. For example, the cost can be calculated by performing an AND calculation on the comparison result information (bit data) and the weight mask (bit data) (see above).

The weight setting section 120 may calculate first weight information on the first image by setting the first logic level as the first weight, and setting the second logic level as the second weight, calculate second weight information on the second image by setting the first logic level as the first weight, and setting the second logic level as the second weight, and perform a logical calculation using the first weight information and the second weight information to calculate the weight mask.

As described above in connection with the first embodiment, it is preferable to set the weight taking account of both the effect of noise within the left image and the effect of noise within the right image. In this case, when the difference determination section 122 outputs the difference calculation results for the left image and the difference calculation results for the right image using the first logic level and the second logic level, it is possible to easily calculate the weight mask taking account of both the difference calculation results for the left image and the difference calculation results for the right image. Specifically, the setting processing section 123 can calculate the weight mask by merely performing an AND calculation on the difference calculation results (bit data) for the left image and the difference calculation results (bit data) for the right image. Note that the logical calculation is not limited to an AND calculation.

The cost calculation section 130 may calculate the cost by calculating average using the result of cumulative sum, which is by calculating on each neighboring pixel using the comparison result information and the weight mask, and the number of neighboring pixels set to the second logic level Although an example in which the cost is calculated by calculating the cumulative sum of the results obtained by integrating the census result comparison output and the weight mask has been described above, a value obtained by dividing the cumulative sum by the number of effective pixels of the weight mask may be used as the cost. The term "effective pixel" used herein in connection with the weight mask refers to a pixel that is set to "1". In the example illustrated in FIG. 12, the number of effective pixels is 12. In this case, the cost may be calculated by dividing 7 by 12. Specifically, the cost calculated from the cumulative sum may be averaged using the number of effective pixels. According to this configuration, the cost can be obtained independently of the number of effective pixels included in the weight mask.

For example, it is considered that the cost is calculated to be a large value when the number of effective pixels is large, even when the number of pixels included in the comparison result information that are set to "1" is relatively small. This is because it is likely that the weight "1" is set to a pixel for which the comparison result information represents "1", and the value of the pixel is easily reflected in the cost. On the other hand, it is not considered that the cost is calculated to be a considerably large value when the number of effective pixels is small, even when the number of pixels included in the comparison result information that are set to "1" is relatively large. This is because it is likely that the weight "0" is set to a pixel for which the comparison result information represents "1", and the value of the pixel may not be reflected in the cost.

Specifically, the number of effective pixels may affect the cost (cost calculation result). Therefore, a process that cancels the difference in the number of effective pixels may be added when it is desired to make a strict determination. Specifically, the cost may be averaged using the number of effective pixels (see above).

4. Third Embodiment

Figure 13:
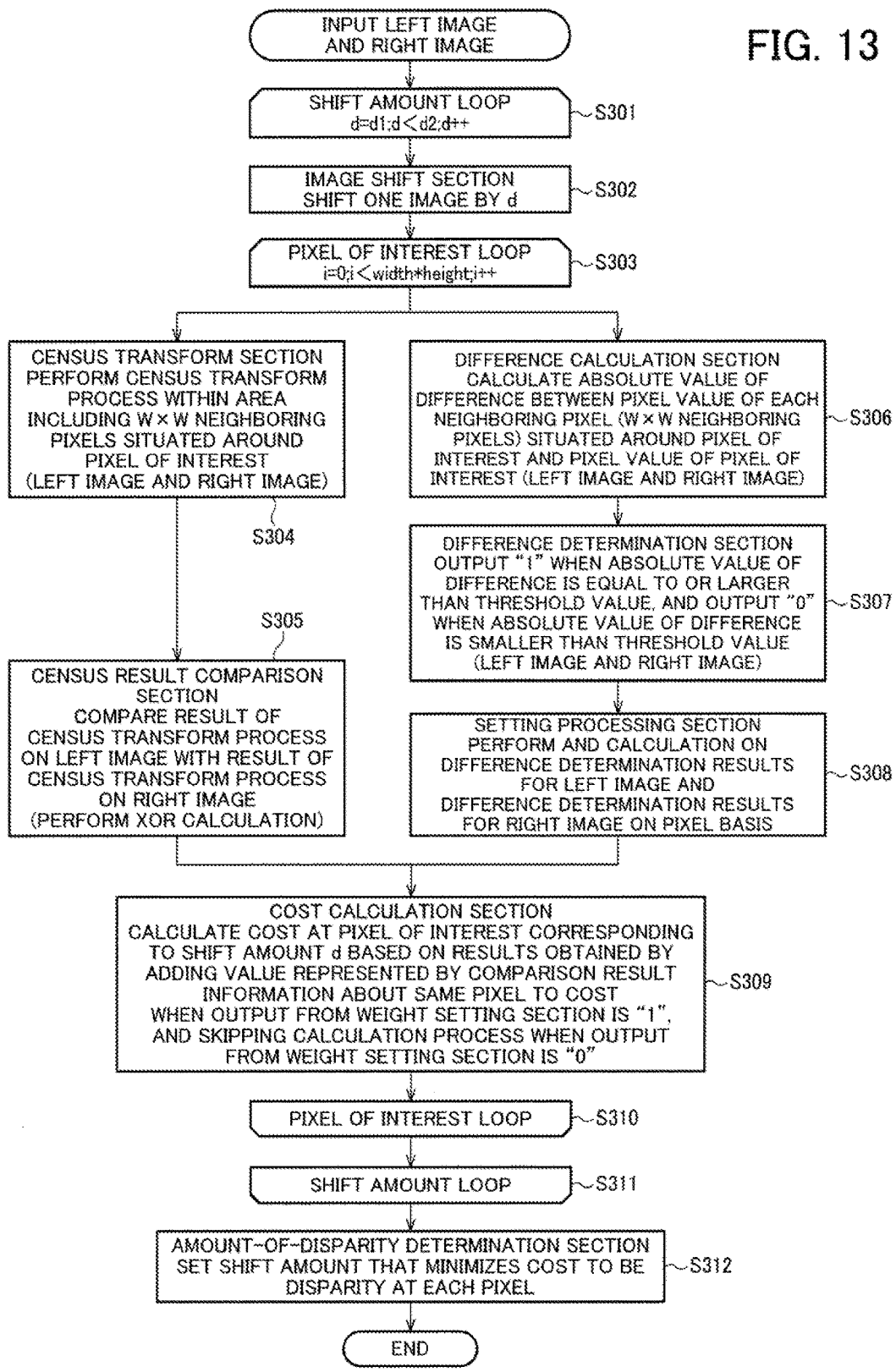
FIG. 13 is a flowchart illustrating a process (third embodiment).

FIG. 13 is a flowchart illustrating the process according to the third embodiment. The steps S301 to S308 and S310 to S312 illustrated in FIG. 13 are the same as the steps S201 to S208 and S210 to S212 illustrated in FIG. 10, and detailed description thereof is omitted.

Figure 14:
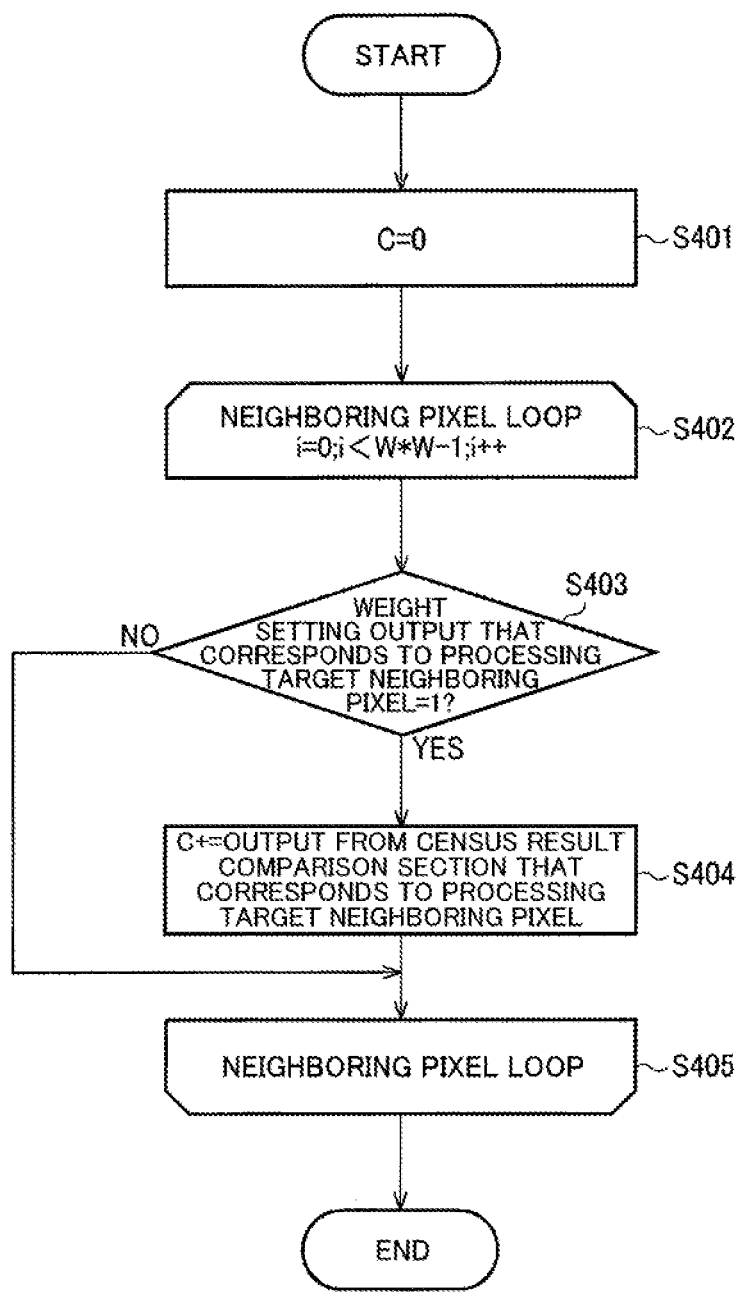
FIG. 14 is a flowchart illustrating a cost calculation process (third embodiment).

The cost calculation section 130 according to the third embodiment calculates the cost using the comparison result information and the weight mask. When the output from the weight setting section 120 is "1", the value represented by the comparison result information about the same pixel is added to the cost. When the output from the weight setting section 120 is "0", the calculation process is skipped. FIG. 14 is a flowchart illustrating the cost calculation process according to the third embodiment.

In a step S401, a variable C that represents the cost is initialized to "0". A loop process is then performed corresponding to the number of neighboring pixels (S402). Specifically, whether or not the bit data of the weight mask that corresponds to the processing target neighboring pixel is "1" is determined (S403). When the bit data of the weight mask that corresponds to the processing target neighboring pixel is "1", the value represented by the comparison result information that corresponds to the processing target neighboring pixel is added to the variable C (S404). When the bit data of the weight mask that corresponds to the processing target neighboring pixel is not "1" (i.e., when the bit data of the weight mask that corresponds to the processing target neighboring pixel is "0"), the step S404 is skipped, and the neighboring pixel loop process is performed. When the process has been performed on all of the neighboring pixels, the neighboring pixel loop process is terminated (S405), and the cost calculation process is terminated.

According to the third embodiment, the cost calculation section 130 skips the cost calculation process with respect to a pixel at which the value of the weight mask is set to the first logic level.

Specifically, the step S404 is skipped when it has been determined that the bit data of the weight mask that corresponds to the processing target neighboring pixel is not "1" (second logic level) in the step S403 (see the flowchart illustrated in FIG. 14). According to this configuration, since it is unnecessary to perform a multiplication process (when the comparison result information represents numerical data) or an AND calculation process (when the comparison result information represents bit data) using the weight mask, it is possible to reduce the circuit scale.

5. Fourth Embodiment

Figure 15:
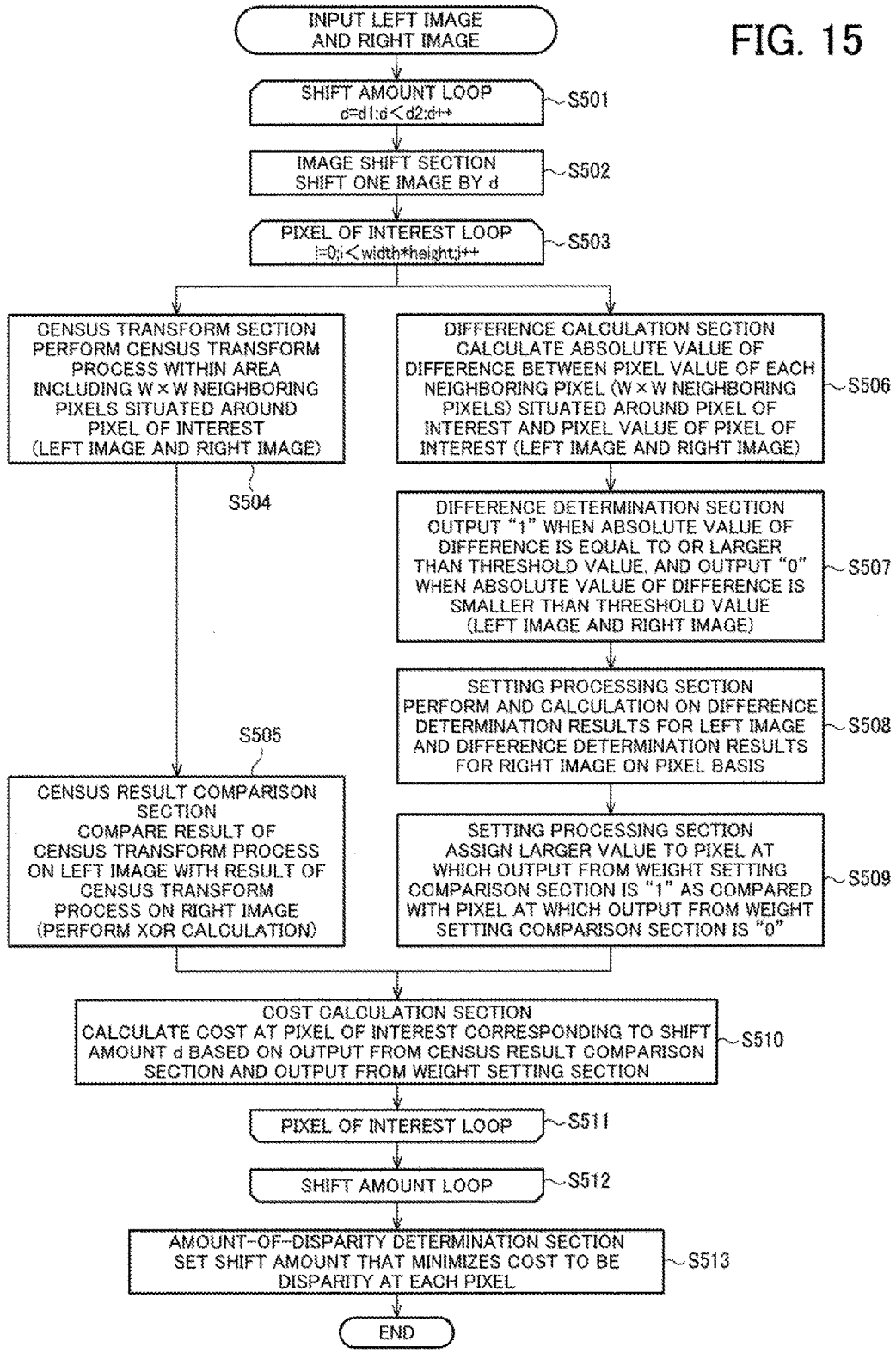
FIG. 15 is a flowchart illustrating a process (fourth embodiment).

FIG. 15 is a flowchart illustrating the process according to the fourth embodiment. In the fourth embodiment, a step S509 is additionally performed by the setting processing section 123.

Specifically, the setting processing section 123 performs an AND calculation on the difference determination results for the left image and the difference determination results for the right image to generate the weight mask (S508). In the fourth embodiment, the setting processing section 123 converts the calculated weight mask on a pixel basis or a bit basis so that a larger value is obtained when the output is "1" as compared with the case where the output is "0" (see the following expression (10) and FIG. 16). In the expression (10), M' represents the value represented by the weight information output from the weight setting section 120, M represents the value of the weight mask, and $\epsilon$ and $\phi$ represent conversion parameters. Note that the conversion parameters $\epsilon$ and $\gamma$ are empirically calculated in advance. The conversion parameters $\epsilon$ and $\phi$ are not limited to an integer.

$$M'(i+k, j+l) = \begin{cases} \varepsilon & \text{if } M(i+k, j+l) == 1 \\ \phi & \text{if } M(i+k, j+l) == 0 \end{cases} \quad (10)$$

Figure 17:
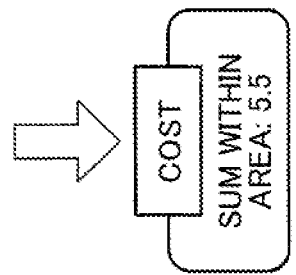
FIG. 17 is a view illustrating a cost calculation process (fourth embodiment).

The cost calculation section 130 calculates the cost using the output from the census result comparison section 113 and the output from the setting processing section 123 (see the following expression (11) and FIG. 17). Note that the case where k=−0 and l=0 is excluded from the calculation when using the expression (11). More specifically, the comparison result information is multiplied by the values of the weight information on a pixel basis, and the calculation results for all of the neighboring pixels in the given area are added up to calculate the cost. In the example illustrated in FIG. 17, the comparison result information represents numerical data. Note that the census bit conversion section 1132 may not be used, and the comparison result information may represent bit data.

$$C(i, j) = \sum_{l=-\frac{W-1}{2}}^{\frac{W-1}{2}} \sum_{k=-\frac{W-1}{2}}^{\frac{W-1}{2}} T(i+k, j+l) \cdot M'(i+k, j+l) \quad (11)$$

According to the fourth embodiment, the weight information (numerical data) (that is directly calculated in the first embodiment) is calculated using a phase that calculates the weight mask (bit data), and a phase that converts the weight mask into numerical data.

6. Fifth Embodiment

Figure 18:
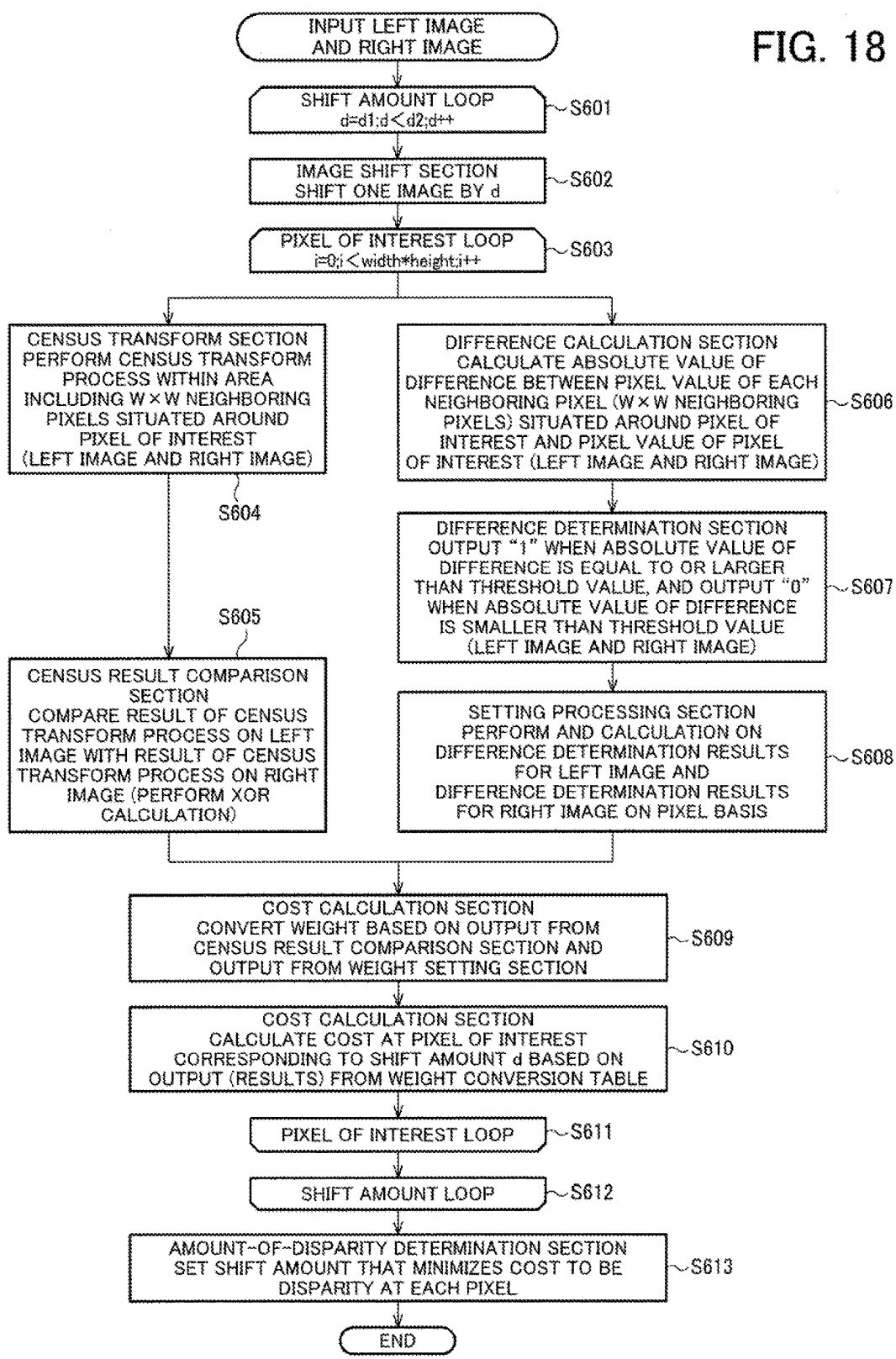
FIG. 18 is a flowchart illustrating a process (fifth embodiment).

FIG. 18 is a flowchart illustrating the process according to the fifth embodiment. The fifth embodiment differs from the above embodiments in that the cost calculation process performed by the cost calculation section 130 is implemented by a step (S609) that refers to a table, and a step (S610) that performs calculations based on the referral results.

Note that each section other than the cost calculation section 130 may be configured in the same manner as described above in connection with the first embodiment. An example in which the census result comparison section 113 does not use the census bit conversion section 1132, and outputs bit data, is described below. An example in which the weight information is the weight mask is described below.

The cost calculation section 130 refers to a conversion table (see FIG. 19) that is provided in advance corresponding to the output from the census result comparison section 113 and the output from the setting processing section 123, and converts the output from the census result comparison section 113 and the output from the setting processing section 123 into a given value that represents the cost on a neighboring pixel basis. When the comparison result information and the weight information represent bit data, the conversion table is information that links (comparison result information, weight mask) (=(0, 0), (0, 1), (1, 0), (1, 1)) to a given value.

Figure 19:
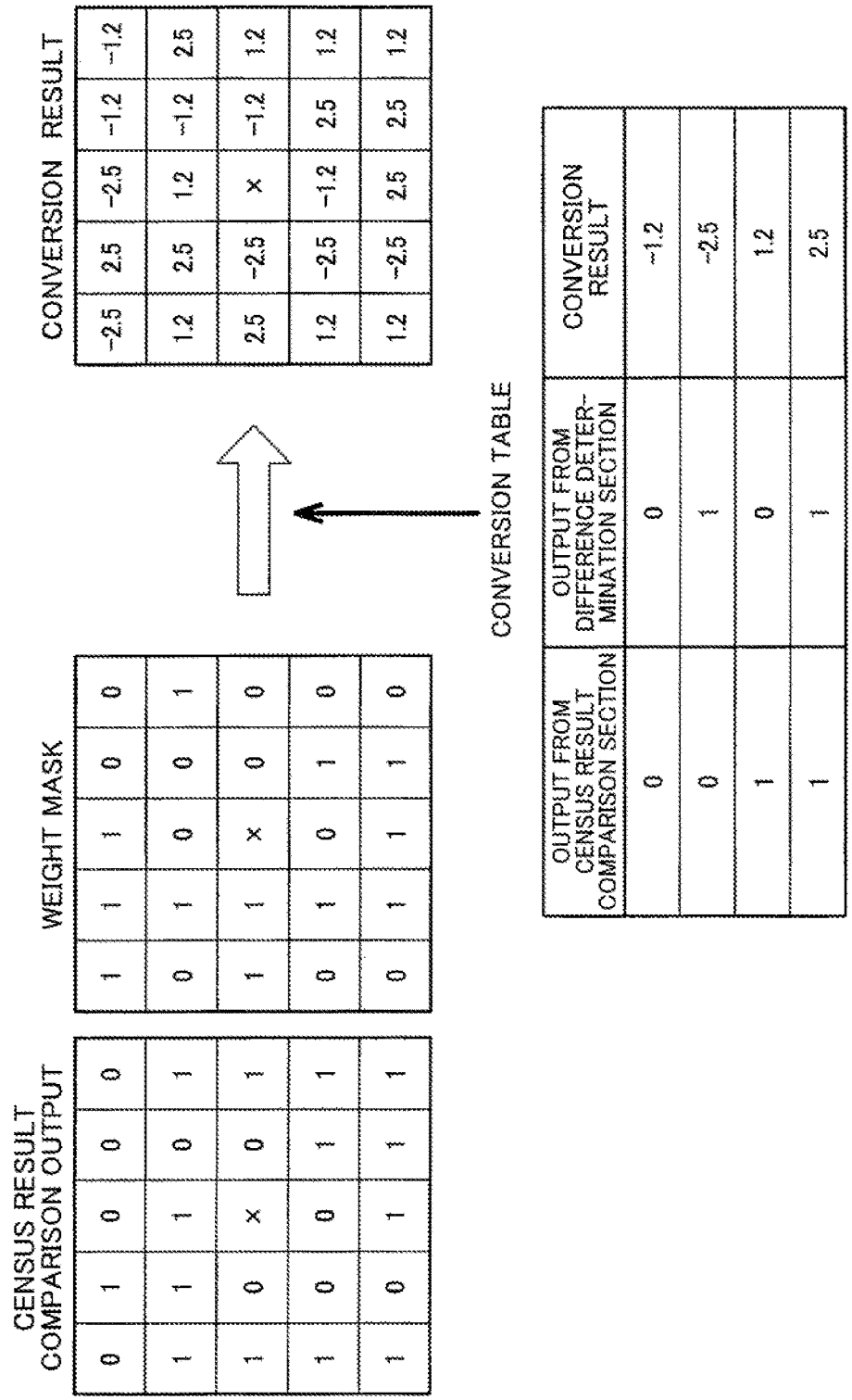
FIG. 19 is a view illustrating a weight setting process (fifth embodiment).

The conversion results are set so that the relationship "(comparison result information, weight mask)=(1, 1)>(1, 0)≥(0, 0)>(0, 1)" is satisfied (see FIG. 19). In the example illustrated in FIG. 19, (1, 1) is converted into 2.5 (maximum value), (1, 0) is converted into 1.2, (0, 0) is converted into −1.2, and (0, 1) is converted into −2.5. Note that the above order is reversed when the shift amount that maximizes the cost is determined to be the amount of disparity.

The details of the above order are described below. The comparison result information is set to "1" when the pixel differs in census transform result between the left image and the right image. It is desirable to avoid a situation in which the shift amount in a state in which the census transform result differs between the left image and the right image is employed as the amount of disparity. Specifically, when the degree of coincidence decreases (i.e., the shift amount is not likely to be employed as the amount of disparity) as the cost increases, a value that increases the cost is set when the comparison result information is set to "1" as compared with the case where the comparison result information is set to "0". Specifically, it is desirable that the relationship "(1, 1)>(0, 1)" and the relationship "(1, 0)>(0, 0)" be satisfied.

The degree of contribution to the cost is higher when the weight mask is set to "1" as compared with the case where the weight mask is set to "0". Specifically, the width of increase when the weight mask is set to "1" should be larger than the width of increase when the weight mask is set to "0" when it is necessary to increase the cost, and the width of increase when the weight mask is set to "1" should be smaller than the width of increase when the weight mask is set to "0" (or the width of decrease when the weight mask is set to "1" should be larger than the width of decrease when the weight mask is set to "0") when it is necessary to decrease the cost. Specifically, it is desirable that the relationship "(1, 1)>(1, 0)" and the relationship "(0, 0)>(0, 1)" be satisfied.

The relationship "(1, 1)>(1, 0)>(0, 0)>(0, 1)" is thus obtained. However, the degree of contribution to the cost may be set to "0" when the weight mask is set to "0". In this case, it is unnecessary that (1, 0) and (0, 0) differ in value. Specifically, an identical value may be set to (1, 0) and (0, 0) (i.e., "(1, 0)≥(0, 0)").

When the census result comparison section 113 uses the census bit conversion section 1132, the values that correspond to the calculation results ("0" and "1") of the XOR calculation section 1131 may be applied to the above order.

A value that corresponds to the cost is calculated by the step S609 on a neighboring pixel basis (see the conversion results illustrated in FIG. 19). The cost calculation section 130 adds up the results output in the step S609 within the given area to calculate the cost (see the following expression (12)). In the expression (12), TM represents the conversion result obtained using the weight conversion table. Note that the case where k=0 and l=0 is excluded from the calculation.

$$C(i, j) = \sum_{l=-\frac{W-1}{2}}^{\frac{W-1}{2}} \sum_{k=-\frac{W-1}{2}}^{\frac{W-1}{2}} TM(i+k, j+l) \quad (12)$$

According to the fifth embodiment, the cost calculation section 130 calculates the cost referring to a conversion table that links the comparison result information, the weight information, and the cost.

The conversion table is the table illustrated in FIG. 19, for example. Although the conversion result linked to the comparison result information (i.e., the output from the census result comparison section 113) and the weight information (i.e., the output from the difference determination section 122) is referred to as "cost", the conversion result does not represent the cost with respect to the pixel of interest. The cost is calculated by adding up the conversion results corresponding to all of the neighboring pixels. Therefore, the conversion result is information that represents the cost corresponding to each (one) neighboring pixel.

According to this configuration, it is possible to calculate the cost without performing a multiplication process or the like on the comparison result information and the weight information. According to the fifth embodiment, it is necessary to store the conversion table. However, since the amount of data of the conversion table is not considerably large (see FIG. 19), no problem occurs even when the conversion table is stored.

The cost calculation process that utilizes (refers to) the conversion table may be a process (performed by the cost calculation section 130) that refers to the conversion table in which the conversion result is determined corresponding to a combination of the value represented by the comparison result information and the value of the weight mask, and calculates the cost using the conversion result calculated on a pixel basis within the given area.

More specifically, the comparison result information may represent bit data. With regard to the value represented by the comparison result information and the value of the weight mask, the value itself is not important, but it is important to determine that the value is which of a plurality of values (see the conversion table illustrated in FIG. 19). For example, when the comparison result information represents only two values (i.e., represents whether or not the left image and the right image are identical to each other), and the weight information also represents only two values (i.e., represents the degree of contribution is high or low), it suffices that the two values can be distinguished from each other from the viewpoint of processing. In this case, it suffices to use 1-bit data instead of assigning numerical data. Specifically, it is possible to efficiently calculate the cost without performing an unnecessary conversion process when the comparison result information and the weight information represent bit data.

Note that numerical data may be used as the comparison result information and the weight information, or bit data that represents two or more bits may be assigned (used) so that the comparison result information and the weight information represent three or more values. In such a case, it is also possible to implement the process that utilizes the conversion table by linking the conversion result to each combination of the value represented by the comparison result information and the value represented by the weight information. For example, when the comparison result information represents s values, and the weight information represents t values, it is possible to implement the process in the same manner as described above by storing a conversion table having sxt rows.

The first to fifth embodiments to which the invention is applied, and the modifications thereof have been described above. Note that the invention is not limited to the first to fifth embodiments and the modifications thereof. Various modifications and variations may be made without departing from the scope of the invention. A plurality of elements described above in connection with the first to fifth embodiments and the modifications thereof may be appropriately combined to implement various configurations. For example, some elements may be omitted from the elements described above in connection with the first to fifth embodiments and the modifications thereof. Some of the elements described above in connection with different embodiments (or modifications thereof) may be appropriately combined. Any term cited with a different term having a broader meaning or the same meaning at least once in the specification and the drawings can be replaced by the different term in any place in the specification and the drawings. Accordingly, various modifications and applications are possible without materially departing from the novel teachings and advantages of the invention.

What is claimed is:

1. An image processing device comprising:
   a processor comprising hardware, the processor being configured to:
   during a stereo matching process performed on the first image and the second image,
   perform a census transform process on a first image and a second image, and calculate comparison result information through a comparison process between results of the census transform process on the first image and results of the census transform process on the second image;
   set weight information for calculating a cost;
   calculate the cost at a pixel of interest using the comparison result information and the weight information; and
   calculate an amount of disparity at the pixel of interest using the cost,
   wherein the processor is configured to set a first weight having a low degree of contribution to the cost on a neighboring pixel which is determined to be affected by noise to a large extent among a plurality of neighboring pixels situated around the pixel of interest, and set a second weight having a high degree of contribution to the cost on a neighboring pixel which is determined to be affected by the noise to a small extent among the plurality of neighboring pixels, the plurality of neighboring pixels being situated in a given area within the first image and the second image.

2. The image processing device as defined in claim 1, wherein the processor is configured to calculate the cost referring to a conversion table that links the comparison result information, the weight information, and the cost.

3. The image processing device as defined in claim 1, wherein the processor is configured to calculate a differential value between the pixel of interest and the neighboring pixel, and set the weight information by determining an effect of the noise from the calculated differential value.

4. The image processing device as defined in claim 3, wherein the processor is configured to set the weight information that is set on each neighboring pixel based on a result obtained by comparing the differential value between the neighboring pixel and the pixel of interest in the first image, with a given threshold value, and a result obtained by comparing the differential value between the neighboring pixel and the pixel of interest in the second image, with the given threshold value.

5. The image processing device as defined in claim 4, wherein the processor is configured to set the given threshold value that is compared with the differential value corresponding to the noise value.

6. The image processing device as defined in claim 4, wherein the processor is configured to set the first weight on the neighboring pixel when at least one of the differential values, which are between the neighboring pixel and the pixel of interest, in the first image and the second image, is equal to or smaller than the given threshold value.

7. The image processing device as defined in claim 1, wherein the processor is configured to convert results of the comparison process into numerical values to acquire the comparison result information.

8. The image processing device as defined in claim 1, wherein the processor is configured to set a weight mask as the weight information, the weight mask having a configuration in which a first logic level is set as the first weight, and a second logic level that differs from the first logic level is set as the second weight.

9. The image processing device as defined in claim 8, wherein the processor is configured to calculate first weight information on the first image by setting the first logic level as the first weight and setting the second logic level as the second weight, calculate second weight information on the second image by setting the first logic level as the first weight, and setting the second logic level as the second weight, and perform a logical calculation using the first weight information and the second weight information to calculate the weight mask.

10. The image processing device as defined in claim 8, wherein the processor is configured to skip the calculating of the cost with respect to a pixel at which a value of the weight mask is set to the first logic level.

11. The image processing device as defined in claim 8, wherein the processor is configured to refer to a conversion table in which a conversion result is determined corresponding to a combination of a value represented by the comparison result information and a value of the weight mask, and calculate the cost using the conversion result calculated on each neighboring pixel within the given area.

12. The image processing device as defined in claim 8, wherein the processor is configured to calculate the cost by calculating average using the result of cumulative sum, which is by calculating on each neighboring pixel using the comparison result information and the weight mask, and a number of the neighboring pixels set to the second logic level.

13. An image processing method comprising:
during a stereo matching process performed on the first image and the second image,
performing a census transform process on a first image and a second image, and calculating comparison result information through a comparison process between results of the census transform process on the first image and results of the census transform process on the second image;
setting weight information for calculating a cost;
calculating the cost at a pixel of interest using the comparison result information and the weight information; and
calculating an amount of disparity at the pixel of interest using the cost,
wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among the plurality of neighboring pixels, the plurality of neighboring pixels being situated in a given area within the first image and the second image.

14. A computer-readable storage device with an executable program stored thereon, wherein the program instructs a microprocessor to perform the following steps of:
during a stereo matching process performed on the first image and the second image,
performing a census transform process on a first image and a second image and calculating comparison result information through a comparison process between results of the census transform process on the first image and results of the census transform process on the second image;
setting weight information for calculating a cost;
calculating the cost at a pixel of interest using the comparison result information and the weight information; and
calculating an amount of disparity at the pixel of interest using the cost,
wherein the setting of the weight information includes setting a first weight having a low degree of contribution to the cost on a neighboring pixel which is determined to be affected by noise to a large extent among a plurality of neighboring pixels situated around the pixel of interest, and setting a second weight having a high degree of contribution to the cost on a neighboring pixel which is determined to be affected by the noise to a small extent among the plurality of neighboring pixels, the plurality of neighboring pixels being situated in a given area within the first image and the second image.

* * * * *